US011470130B1

(12) United States Patent
Gladstone et al.

(10) Patent No.: US 11,470,130 B1
(45) Date of Patent: Oct. 11, 2022

(54) CREATING MEDIA CONTENT STREAMS FROM LISTENER INTERACTIONS

(71) Applicant: Amazon Technologies, Inc., Seattle, WA (US)

(72) Inventors: Michael Gladstone, Los Angeles, CA (US); Anna Katherine Skelsey, Los Angeles, CA (US); Aamir Shah, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/364,014

(22) Filed: Jun. 30, 2021

(51) Int. Cl.
*G06F 15/16* (2006.01)
*H04L 65/40* (2022.01)
*H04L 67/50* (2022.01)

(52) U.S. Cl.
CPC ............ *H04L 65/40* (2013.01); *H04L 67/535* (2022.05)

(58) Field of Classification Search
CPC ................................ H04L 65/40; H04L 67/22
USPC .................. 709/217, 218, 219, 231
See application file for complete search history.

(56) References Cited

U.S. PATENT DOCUMENTS

| | | | |
|---|---|---|---|
| 8,560,683 B2 | 10/2013 | Funk et al. | |
| 8,572,243 B2 | 10/2013 | Funk et al. | |
| 9,003,032 B2 | 4/2015 | Funk et al. | |
| 9,369,740 B1 | 6/2016 | Funk et al. | |
| 9,706,253 B1 | 7/2017 | Funk et al. | |
| 9,729,596 B2 | 8/2017 | Sanghavi et al. | |
| 9,781,491 B2 | 10/2017 | Wilson | |
| 9,872,069 B1 | 1/2018 | Funk et al. | |
| 10,091,547 B2 | 10/2018 | Sheppard et al. | |
| 10,110,952 B1 * | 10/2018 | Gupta | ................ H04N 21/4436 |
| 10,135,887 B1 | 11/2018 | Esser et al. | |

(Continued)

FOREIGN PATENT DOCUMENTS

| | | |
|---|---|---|
| AU | 2013204532 B2 | 11/2014 |
| CA | 2977959 A1 | 9/2016 |

(Continued)

OTHER PUBLICATIONS

Tengeh, R. K., & Udoakpan, N. (2021). Over-the-Top Television Services and Changes in Consumer Viewing Patterns in South Africa. Management Dynamics in the Knowledge Economy. 9(2), 257-277. DOI 10.2478/mdke-2021-0018 ISSN: 2392-8042 (online) www.managementdynamics.ro; URL: https://content.sciendo.com/view/journals/mdke/mdke-overview.xml.

(Continued)

*Primary Examiner* — Liang Che A Wang
(74) *Attorney, Agent, or Firm* — Athorus, PLLC

(57) ABSTRACT

When a media program hosted by a creator is played by devices of listeners, the listeners execute gestures or other interactions with user interfaces displayed on the devices. Times at which the interactions are received are tracked, and the interactions are interpreted to characterize feedback regarding media content being played at the times at which the interactions are received. Portions of the media program that are of high interest to listeners, as determined by such interactions, are identified and combined into consolidated media programs and stored. The consolidated media programs formed from such portions are available to listeners, in a prerecorded format, as condensed alternatives to the media programs.

20 Claims, 26 Drawing Sheets

(56) References Cited

U.S. PATENT DOCUMENTS

| | | |
|---|---|---|
| 10,140,364 B1 | 11/2018 | Diamondstein |
| 10,313,726 B2 | 6/2019 | Woods et al. |
| 10,356,476 B2 | 7/2019 | Dharmaji |
| 10,432,335 B2 | 10/2019 | Bretherton |
| 10,489,395 B2 | 11/2019 | Lakkur et al. |
| 10,698,906 B2 | 6/2020 | Hargreaves et al. |
| 10,719,837 B2 | 7/2020 | Kolowich et al. |
| 10,769,678 B2 | 9/2020 | Li |
| 10,846,330 B2 | 11/2020 | Shilo |
| 10,985,853 B2 | 4/2021 | Bretherton |
| 10,986,064 B2 | 4/2021 | Siegel et al. |
| 10,997,240 B1 * | 5/2021 | Aschner ............. H04N 21/2187 |
| 2002/0042920 A1 | 4/2002 | Thomas et al. |
| 2002/0056087 A1 | 5/2002 | Berezowski et al. |
| 2007/0124756 A1 | 5/2007 | Covell et al. |
| 2007/0271518 A1 | 11/2007 | Tischer et al. |
| 2007/0271580 A1 | 11/2007 | Tischer et al. |
| 2008/0086742 A1 | 4/2008 | Aldrey et al. |
| 2009/0044217 A1 | 2/2009 | Lutterbach et al. |
| 2009/0076917 A1 | 3/2009 | Jablokov et al. |
| 2010/0088187 A1 | 4/2010 | Courtney et al. |
| 2011/0067044 A1 | 3/2011 | Albo |
| 2012/0191774 A1 | 7/2012 | Bhaskaran et al. |
| 2012/0304206 A1 | 11/2012 | Roberts et al. |
| 2012/0311618 A1 | 12/2012 | Blaxland |
| 2013/0074109 A1 * | 3/2013 | Skelton ................ H04N 21/252 725/14 |
| 2013/0247081 A1 | 9/2013 | Vinson et al. |
| 2014/0019225 A1 | 1/2014 | Guminy et al. |
| 2014/0040494 A1 * | 2/2014 | Deinhard ............ H04L 65/1083 709/231 |
| 2014/0108531 A1 | 4/2014 | Klau |
| 2014/0123191 A1 | 5/2014 | Hahn et al. |
| 2014/0325557 A1 | 10/2014 | Evans et al. |
| 2014/0372179 A1 | 12/2014 | Ju et al. |
| 2015/0163184 A1 | 6/2015 | Kanter et al. |
| 2015/0289021 A1 | 10/2015 | Miles |
| 2015/0319472 A1 | 11/2015 | Kotecha et al. |
| 2016/0188728 A1 | 6/2016 | Gill et al. |
| 2016/0266781 A1 | 9/2016 | Dandu et al. |
| 2017/0127136 A1 | 5/2017 | Roberts et al. |
| 2017/0289617 A1 * | 10/2017 | Song .................... H04N 21/812 |
| 2018/0025078 A1 * | 1/2018 | Quennesson ........... G06F 16/00 725/141 |
| 2018/0255114 A1 | 9/2018 | Dharmaji |
| 2018/0322411 A1 | 11/2018 | Wang et al. |
| 2019/0132636 A1 * | 5/2019 | Gupta ................ H04N 21/4424 |
| 2021/0256086 A1 * | 8/2021 | Askarian ............ G06F 16/9558 |
| 2022/0038783 A1 | 2/2022 | Wee |

FOREIGN PATENT DOCUMENTS

| | | |
|---|---|---|
| CN | 104813305 A | 7/2015 |
| KR | 20170079496 A | 7/2017 |
| WO | 2019089028 A1 | 5/2019 |

OTHER PUBLICATIONS

Github, "Spotify iOS SDK," GitHub.com, GitHub Inc and GitHub B.V., Feb. 17, 2021, available at URL: https://github.com/spotify/ios-sdk#how-do-app-remote-calls-work, 10 pages.

Stack Overflow, "Audio mixing of Spotify tracks in IOS app," stackoverflow.com, Stack Overflow Network, Jul. 2012, available at URL: https://stackoverflow.com/questions/11396348/audio-mixing-of-spotify-tracks-in-ios-app, 2 pages.

\* cited by examiner

CREATING MEDIA CONTENT STREAMS FROM LISTENER INTERACTIONS

BACKGROUND

Today, many media programs are broadcast to viewers or listeners over the air, e.g., on radio or television, or streamed or otherwise transmitted to the viewers or listeners over one or more computer networks, which may include the Internet in whole or in part. Some media programs are evaluated by professional journalists or amateur viewers who may describe emotions that they experienced while viewing or listening to a media program, or provide opinions of the media program, and express such emotions or opinions to others in print, in other media programs, via social media, by word of mouth, or in any other manner.

Existing techniques for evaluating media programs, or for identifying media programs that are of interest to viewers as opposed to media programs that are not, tend to suffer from a number of limitations. First, to the extent that such techniques rely on feedback provided by an evaluator, reviews of media programs are generally always subject to any inherent biases of the evaluator, such as a preference or a disdain for a specific actor, director or other personality, which may or may not be consistent with opinions of the public at large. Second, evaluating a media program is typically an arduous or inefficient process that requires a designated evaluator to view a media program in its entirety, to generate a written record or summary of the media program from the perspective of the evaluator, and to communicate or otherwise distribute the written record or summary to one or more other viewers or listeners, or prospective viewers or listeners. Moreover, when an evaluator prepares a written record or summary of a media program, the written record or summary typically characterizes the media program in a single manner for the entire program, and does not highlight any specific portions of the media programs that, in the opinion of the evaluator, are particularly good or bad. Furthermore, where a written review or summary of a media program successfully convinces a viewer or listener to try the media program, the viewer or listener must typically sit through the media program in its entirety, even where the most relevant or most desirable portions are distributed throughout the media program.

DETAILED DESCRIPTION

As is set forth in greater detail below, the present disclosure is directed to creating streams of media content based on interactions received from listeners, e.g., subscribers, to one or more media programs that are aired, broadcast, streamed or otherwise transmitted to systems or devices of such listeners over computer networks, such as the Internet, or from other individuals associated with the media programs, including but not limited to creators, guests, contributors or others. More specifically, the systems and methods of the present disclosure are directed to receiving interactions with a system or device of a listener or another individual indicating that the listener or the individual approves of media content, disapproves of the media content, or has some emotion or opinion of the media content other than approval or disapproval. Times at which listeners or other individuals execute their interactions and express their approval, disapproval or other emotions or opinions are determined based on such interactions. Portions of a media program, e.g., "highlights" of the media program, may be identified as corresponding to periods of time when large numbers of interactions are received from listeners or others, or periods of time when interactions are received from listeners or others at high rates or frequencies. Such portions may be consolidated or otherwise assembled, e.g., in a serial order corresponding to an order in which such portions were presented to listeners or others in the media program, or in any other order. Additionally, portions of the media program identified based on such interactions may be consolidated along with one or more descriptors of such portions, or any other media.

Subsequently, consolidated portions of a media program identified based on interactions may be presented to other listeners as an option in lieu of the media program, or as an alternative to the media program, e.g., in a pre-recorded format or "on demand," thereby permitting such other listeners to receive a condensed viewing or listening experience of the media program, after the media program was already recorded. Information regarding interactions with media content of a media program, including not only numbers, rates or frequencies of interactions but also types of interactions and emotions or opinions expressed thereby, may be presented to a creator or a listener, or to any other individual. In some implementations, a creator may specifically select one or more portions of media program for inclusion in a consolidated media program on any basis, such as by one or more gestures or other interactions with a user interface.

Figure 1A:
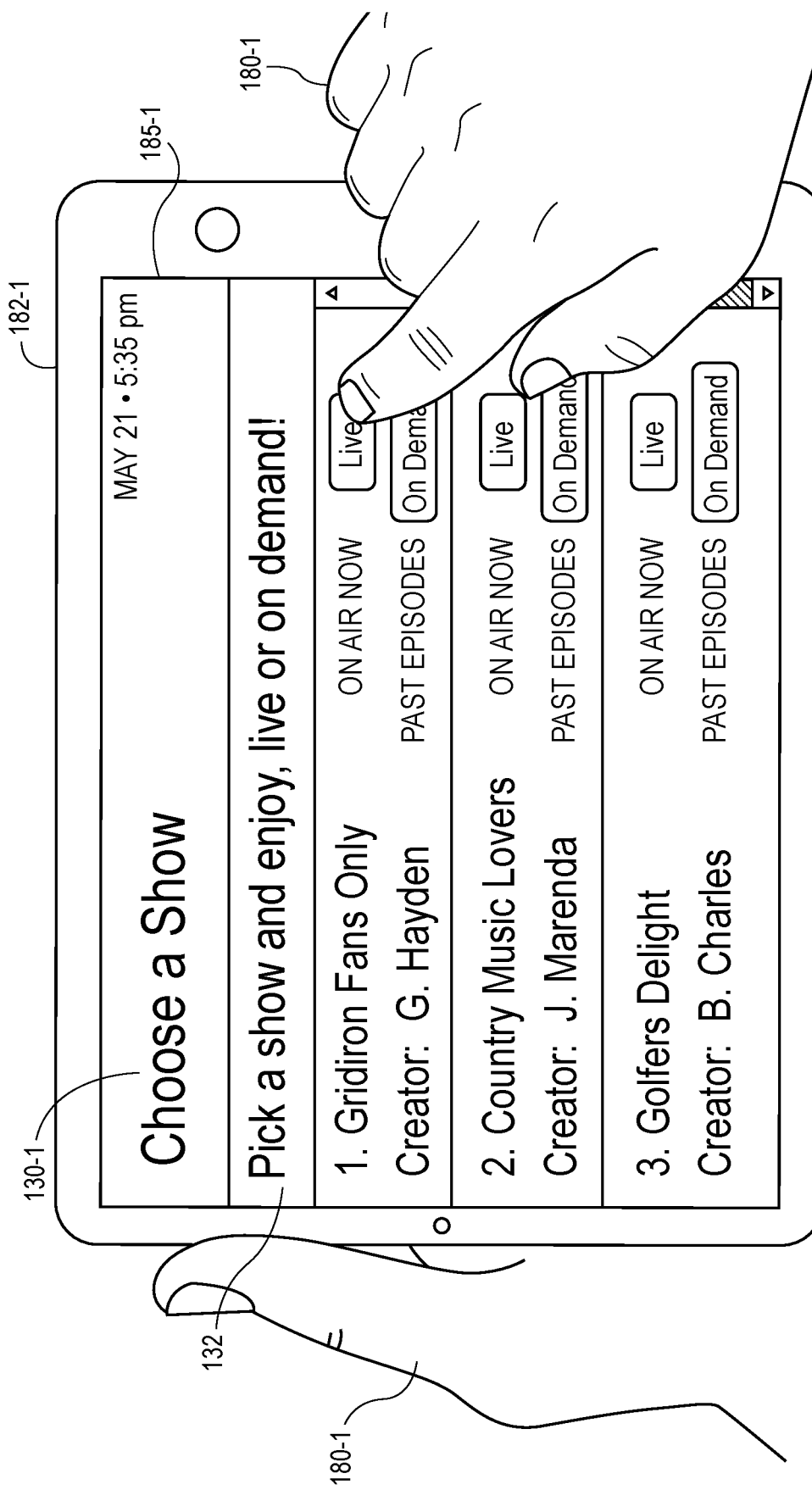
FIGS. 1A through 1G are views of aspects of one system for creating media content streams in accordance with embodiments of the present disclosure.

Referring to FIGS. 1A through 1G, views of aspects of one system for creating media content streams in accordance with embodiments of the present disclosure are shown. As is shown in FIG. 1A, a listener 180-1 operates a mobile device 182-1 (e.g., a tablet computer or smartphone, or any other computer device or system) to select one of a plurality of media programs.

As is shown in FIG. 1A, the mobile device 182-1 includes a display 185-1 having a user interface 130-1 rendered thereon. In some implementations, the display 185-1 may be a capacitive touchscreen, a resistive touchscreen, or any other system for receiving interactions by the listener 180-1. Alternatively, or additionally, the listener 180-1 may interact with the user interface 130-1 or the mobile device 182-1 in any other manner, such as by way of any input/output ("I/O") devices, including but not limited to a mouse, a stylus, a touchscreen, a keyboard, a trackball, or a trackpad, as well as any voice-controlled devices or software (e.g., a personal assistant), which may capture and interpret voice commands using one or more microphones or acoustic sensors provided on the mobile device 182-1, or any other systems (not shown). In accordance with implementations of the present disclosure, the user interface 130-1, or other user interfaces, may include any number of buttons, text boxes, checkboxes, drop-down menus, list boxes, toggles, pickers, search fields, tags, sliders, icons, carousels, or any other interactive or selectable elements or features that are configured to display information to the listener 180-1 or to receive interactions from the listener 180-1 via the display 185-1.

The user interface 130-1 includes a section 132 having a plurality of elements, each of which may be associated with a media program available to listeners, e.g., the listener 180-1 via the mobile device 182-1. For example, each of the elements corresponding to media programs in the section 132 may include one or more selectable elements or features that, when selected, permit the listener 180-1 to select one of the media programs, e.g., in a "live" or initial broadcast or streaming, or in a pre-recorded format (or "on demand"). Each of the elements may identify one or more attributes of a media program, including a name or title of the media program, viz., "Gridiron Fans Only," "Country Music Lovers," or "Golfers Delight," as well as a creator associated with the media program, or any other descriptors or characteristics of the media program. Each of the elements may further include one or more selectable features for adding a reminder to a calendar application or program, or otherwise scheduling or initiating a playing of the media program by the mobile device 182-1.

Figure 1B:
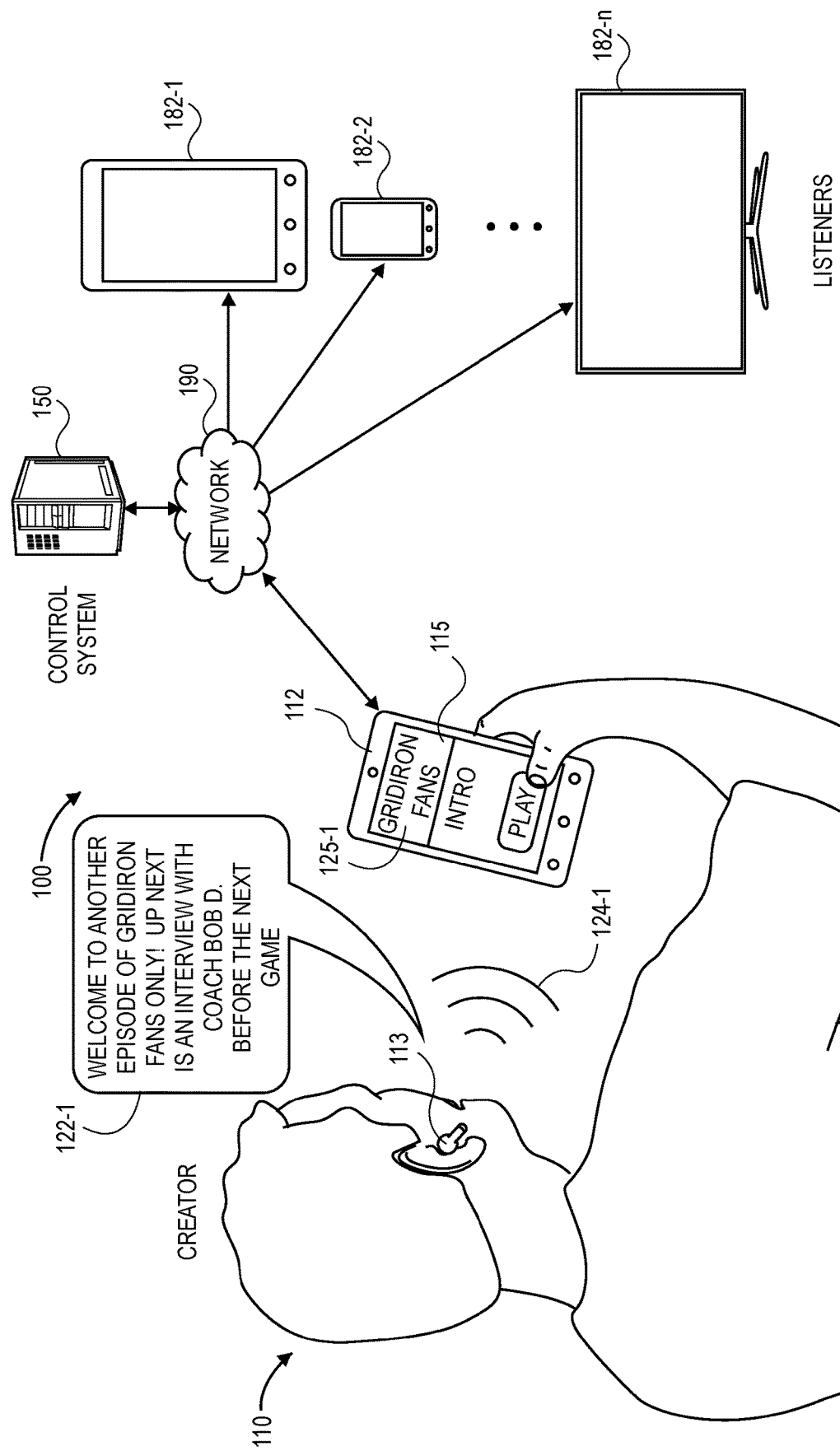

As is shown in FIG. 1B, a system 100 includes a mobile device 112 (e.g., a smartphone, a tablet computer, a laptop computer, or any other computer device or system) of a creator 110 (e.g., a user, or a host), a control system 150 (e.g., one or more servers or other computer systems) and a plurality of computer devices 182-1, 182-2 . . . 182-n or other systems of any number n of listeners (or subscribers, or users), including the mobile device 182-1. The mobile device 112, the control system 150 and the computer devices 182-1, 182-2 . . . 182-n are connected to one another over one or more networks 190, which may include the Internet in whole or in part. The creator 110 wears one or more ear buds 113 (or ear phones, or head phones) or other communication systems or devices which may be in communication with the mobile device 112, and may be configured to exchange (e.g., transfer or receive) data relating to audio signals or any other data with the mobile device 112. The computer device 182-2 may be a smartphone or like system. The computer device 182-n may be a television or like system. However, the computer systems or devices that may be operated or utilized in accordance with the present disclosure are not limited by any of the devices or systems shown in FIG. 1B.

As is shown in FIG. 1B, the mobile device 112 includes a display 115 (e.g., a touchscreen) having a user interface 125-1 rendered thereon. The user interface 125-1 may include one or more interactive or selectable features that enable the creator 110 to construct a media program from one or more sets of media content, or to control the transmission or receipt of media content in accordance with the media program, e.g., by the control system 150 or from any other source, to or from the computer devices 182-1, 182-2 . . . 182-n over the networks 190. In some implementations, the control system 150 may establish a two-way or bidirectional channel or connection with the mobile device 112, and one-way or unidirectional channels or connections with one or more of the devices 182-1, 182-2 . . . 182-n. In some other implementations, the control system 150 may establish one-way or unidirectional channels with the mobile device 112, and two-way or bidirectional channels with any number of the devices 182-1, 182-2 . . . 182-n.

In some implementations, the display 115 may be a capacitive touchscreen, a resistive touchscreen, or any other system for receiving interactions by the creator 110. Alternatively, or additionally, the creator 110 may interact with the user interface 125-1 or the mobile device 112 in any other manner, such as by way of any input/output ("I/O") devices, including but not limited to a mouse, a stylus, a touchscreen, a keyboard, a trackball, or a trackpad, as well as any voice-controlled devices or software (e.g., a personal assistant), which may capture and interpret voice commands using one or more microphones or acoustic sensors provided on the mobile device 112, the ear buds 113, or any other systems (not shown). In accordance with implementations of the present disclosure, the user interface 125-1, or other user interfaces, may include any number of buttons, text boxes, checkboxes, drop-down menus, list boxes, toggles, pickers, search fields, tags, sliders, icons, carousels, or any other interactive or selectable elements or features that are configured to display information to the creator 110 or to receive interactions from the creator 110 via the display 115.

As is further shown in FIG. 1B, the creator 110 provides an utterance 122-1 of one or more words that are intended to be heard by one or more listeners using the computer devices 182-1, 182-2 . . . 182-n. In particular, the creator 110 identifies a theme of the media program and a title or selection of an author or artist of media content to be played during the media program, viz., "Welcome to another episode of Gridiron Fans Only! Up next is an interview with Coach Bob D. before the next game," in accordance with a broadcast plan for the media program or spontaneously. The mobile device 112 and/or the ear buds 113 may capture acoustic data 124-1 representing the utterance 122-1 of the creator 110, and transmit the acoustic data 124-1 to the control system 150 over the one or more networks 190. The control system 150 may then cause data, e.g., some or all of the acoustic data 124-1, to be transmitted to one or more computer systems or devices of listeners over one or more networks 190, in order to present the utterance 122-1 of the creator 110 to such listeners.

In some implementations, the user interfaces of the present disclosure (viz., the user interface 125-1, or others) may include one or more features enabling the creator 110 to exercise control over the media content being played by the devices 182-1, 182-2 . . . 182-n of the listeners. For example, such features may enable the creator 110 to manipulate a volume or another attribute or parameter (e.g., treble, bass, or others) of audio signals represented in data transmitted to the respective devices 182-1, 182-2 . . . 182-n of the listeners by one or more gestures or other interactions with a user interface rendered on the mobile device 112. In response to instructions received from the mobile device 112 by such gestures or interactions, the control system 150 may modify the data transmitted to the respective devices 182-1, 182-2 . . . 182-n of the listeners accordingly. In some implementations, such features may enable a listener to manipulate a volume or another attribute or parameter (e.g., treble, bass, or others) of audio signals presented by the respective devices 182-1, 182-2 . . . 182-n, such as by one or more gestures or other interactions with user interfaces rendered on the respective devices 182-1, 182-2 . . . 182-n. Any of the user interfaces described herein may include one or more elements or features for playing, pausing, stopping, rewinding or fast-forwarding media content from any source, in response to gestures or other interactions with such elements or features, as well as one or more visual cues such as "on the air!" or other identifiers of media content that is currently being played, and from which source. The user interfaces may further include one or more clocks, timers or other representations of durations for which media content has been played, times remaining until the playing of media content is expected to end or be terminated, or times at which other media content is to be played.

Alternatively, or additionally, user interfaces of the present disclosure may also include one or more elements or features for playing, pausing, stopping, rewinding or fast-forwarding media content to be represented in data transmitted to the respective devices 182-1, 182-2 . . . 182-n. For example, the user interfaces may further include one or more elements or features for initiating a playing of any type or form of media content from any source, and the control system 150 may establish or terminate channels or connections with such sources, as necessary, or modify data transmitted to the respective devices 182-1, 182-2 . . . 182-n of the listeners to adjust audio signals played by such devices, in response to gestures or other interactions with such elements or features.

Figure 1C:
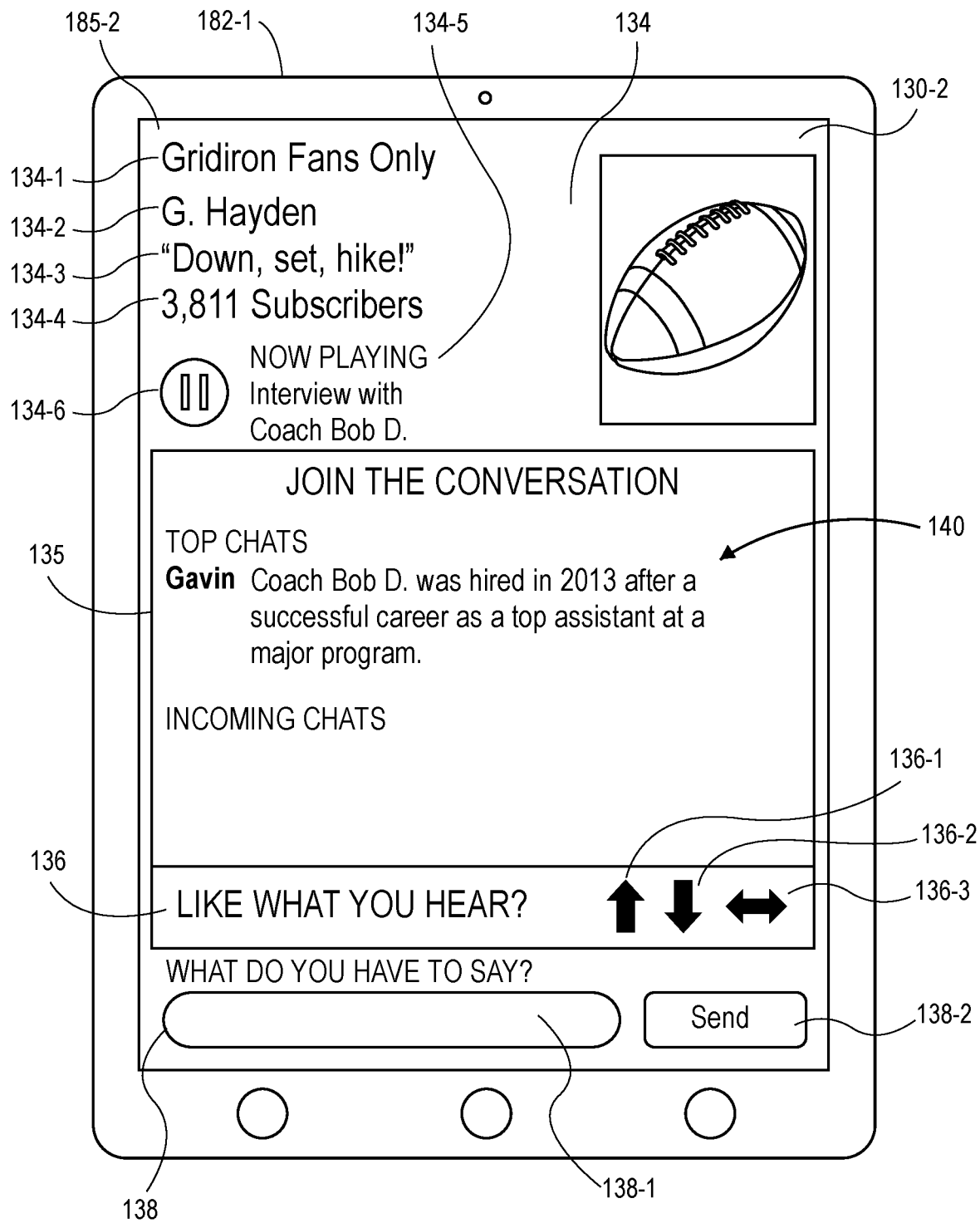

As is shown in FIG. 1C, during the playing of the media program by the control system 150 shown in FIG. 1B, the mobile device 182-1 displays a user interface 130-2 including a plurality of sections 134, 135, 136, 138 rendered thereon. The section 134 of the user interface 130-2 is provided at an upper edge or area of the display 185-1, and includes one or more identifiers or information regarding the media program, including but not limited to a title 134-1 of the media program, and a name 134-2 of the creator 110 of the media program. The section 134 may further include a motto (or slogan) 134-3 of the media program, a number of subscribers 134-4 to the media program (e.g., listeners or potential listeners who have registered to receive or otherwise requested one or more episodes of the media program), a description 134-5 of any media content being played in accordance with the media program, viz., an interview between the creator 110 and one of the listeners, and/or one or more elements (or features) 134-6 for playing, pausing, stopping, rewinding or fast-forwarding media content. In some implementations, the section 134 or any other section of the user interface 130-2 may further include a rating of the media program (e.g., a qualitative or quantitative rating that may visually express a quality of the media program as rated by listeners in numbers, stars or other visual features), or any other information regarding the media program or the creator.

The section 135 is provided in a substantially central area of the display 185-1 below the section 134, and includes portions for displaying highly ranked or relevant chat messages (viz., "Top Chats") received from the creator 110 or any listeners, as well as any number of other chat messages (viz., "Incoming Chats") received from the creator 110 or other listeners. For example, as is shown in FIG. 1C, the section 135 includes a chat message 140 received from the creator 110, viz., "Gavin," that references the theme of the media content currently being played in accordance with the media program, and states, "Coach Bob D. was hired after a successful career as a top analyst at a major program."

The section 136 is provided between the section 135 and the section 138, and includes a plurality of interactive features 136-1, 136-2, 136-3 for expressing an emotion or an opinion regarding the media program in general, or any chat messages or media content in particular, by one or more interactions with the user interface 130-2. For example, as is shown in FIG. 1C, the section 136 includes an arrow 136-1 pointed vertically upward on the display 185-1, which may be selected by the listener 180-1 to indicate an approval of the media content then being played by the device 182-1, or to otherwise express a positive opinion regarding the media content then being played. The section 136 further includes an arrow 136-2 pointed vertically downward on the display 185-1, which may be selected by the listener 180-2 to indicate a disapproval of the media content then being played by the device 182-1, or to otherwise express a negative opinion regarding the media content. The section 136 also includes a double-ended arrow 136-3 aligned substantially horizontally on the display 185-1, which may be selected by the listener 180-1 to indicate neither an approval nor a disapproval of the media content then being played by the device 182-1, or to otherwise express a neutral opinion regarding the media content.

The section 138 is provided at a lower edge or area of the display 185-1, and includes a text box 138-1 or a like feature that enables the listener 180-1 or any other user of the mobile device 182-1 to provide a chat message to the creator 110 or other listeners, e.g., by executing one or more gestures or other interactions with a virtual keyboard rendered on the display 185-1, and a button 138-2 or another selectable feature for transmitting the chat message provided within the text box to the control system 150 or the creator 110. Alternatively, the listener 180-1 may provide a chat message or other information to the mobile device 182-1 for transmission to the creator 110 or the control system 150 in any other manner, e.g., by one or more voice commands or utterances, or by gestures or interactions with a drop-down menu.

The user interface 130-2 may be rendered by the mobile device 182-1 in any manner. For example, code for rendering the user interface 130-2 may be transmitted to the mobile device 182-1 by the control system 150 or from any other source, and the mobile device 182-1 may render the user interface 130-2 and any of the sections 134, 135, 136, 138 within the user interface 130-2 or on the display 185-1 accordingly. The code may be programmed in HTML or any other language, e.g., Java or JavaScript, and may be executed by a widget, an application programming interface (or "API"), or any other application or feature of the mobile device 182-1. Moreover, the user interface 130-2 may include the features of the sections 134, 135, 136, 138 in any locations on the user interface 130-2, and may be aligned in any orientation (e.g., portrait or landscape) with respect to the display 185-1.

Figure 1D:
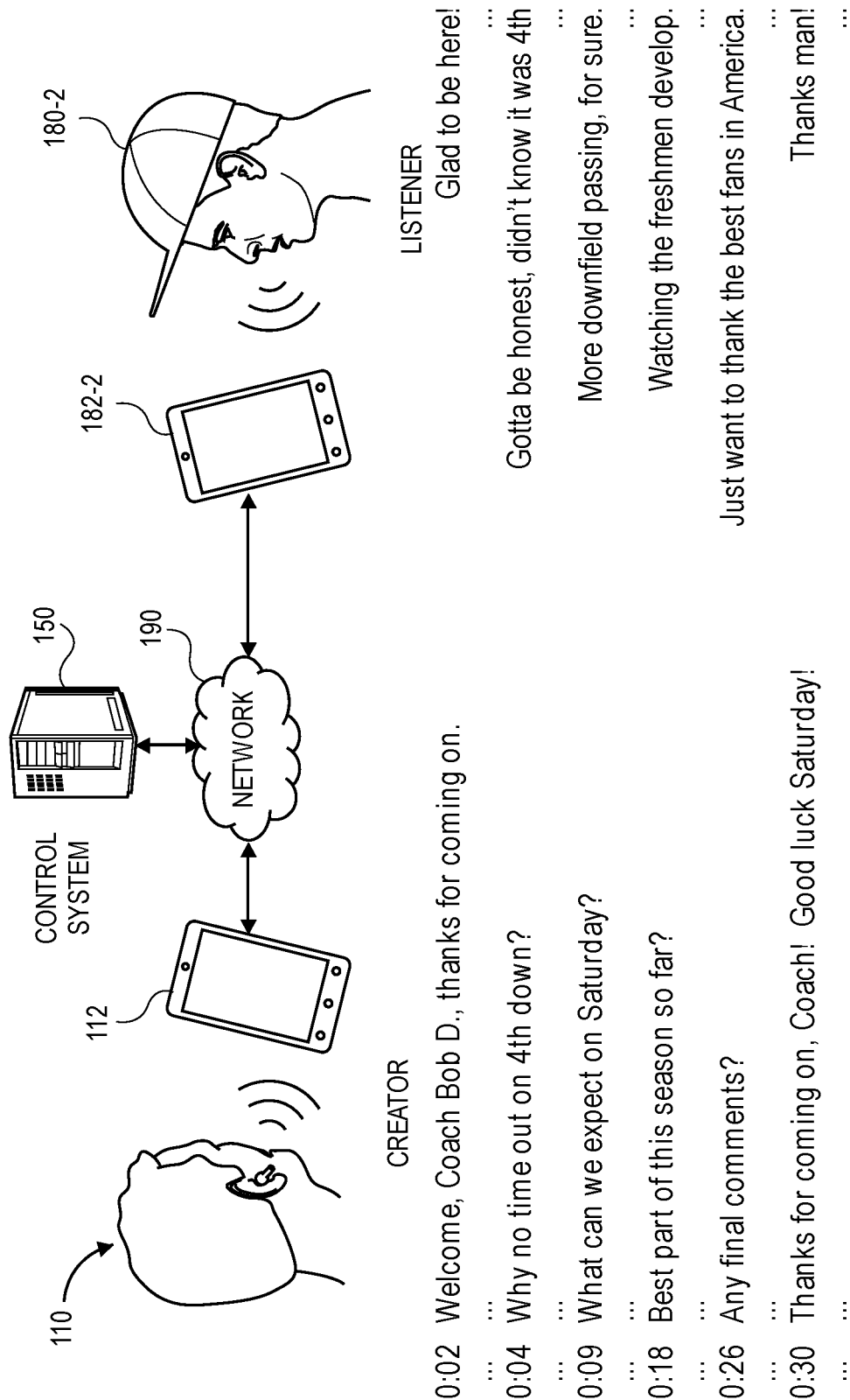

As is shown in FIG. 1D, the media program includes an interview by the creator 110 with one of the listeners 180-2 by way of one of the devices 182-2. Media content including data representing spoken words by the creator 110 and the listener 180-2 captured by the mobile device 112 and the device 182-2, respectively, is received by the control system 150 and transmitted to devices of listeners, e.g., the devices

182-1, 182-2 . . . 182-*n* shown in FIG. 1B, in accordance with the media program. For example, as is shown in FIG. 1D, the creator 110 and the listener 180-2 exchange questions, answers and other commentary over a thirty-minute period, and media content representing such commentary is transmitted to devices of the listeners.

While the media content of the media program, e.g., the questions, answers and other commentary of the creator 110 and the listener 180-2 shown in FIG. 1D, is presented to listeners via their respective devices, the listeners may express their opinions on the media program by one or more gestures or other interactions with user interfaces rendered by their respective devices, such as the one or more interactive features (viz., arrows) 136-1, 136-2, 136-3 in the section 136 of the user interface 130-2 shown in FIG. 1C.

Figure 1E:
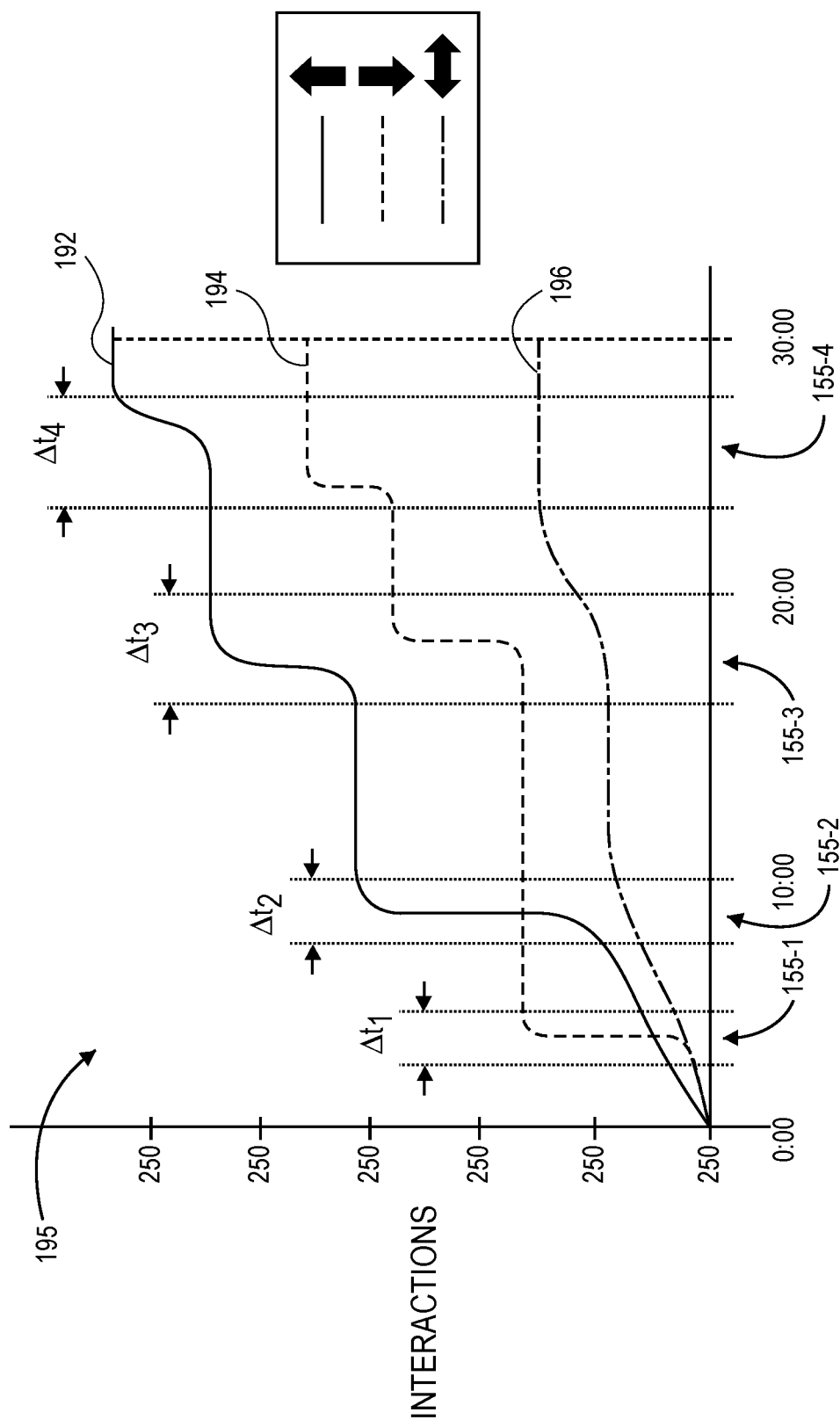

As is shown in FIG. 1E, a plot 195 depicts interactions received by the control system 150 from devices of listeners (or other users) and times at which such interactions are recorded with respect to the media program. In particular, the plot 195 depicts positive interactions 192, negative interactions 194 and neutral interactions 196 received at times with respect to the media program. The interactions 192, 194, 196 shown in the plot 195 are processed to characterize feedback of the listeners represented by such interactions.

For example, when a user (e.g., a listener, a creator, or any other individual associated with the media program) executes an interaction with the arrow 136-1 that is pointed vertically upward in the section 136 of the user interface 130-2 shown in FIG. 1C at a given time with respect to the media program, or a like feature, it may be understood or inferred that the user approves of or otherwise has a positive opinion of the media content of the media program at that time. Similarly, when a user executes an interaction with the arrow 136-2 that is pointed vertically downward in the section 136 of the user interface 130-2 shown in FIG. 1C at a given time with respect to the media program, or a like feature, it may be understood or inferred that the user disapproves of or otherwise has a negative opinion of the media content of the media program at that time. Likewise, when a user executes an interaction with the double-ended arrow 136-3 aligned substantially horizontally in the section 136 of the user interface 130-2 shown in FIG. 1C at a given time with respect to the media program, or a like feature, it may be understood or inferred that the user neither approves nor disapproves of the media content of the media program at that time, or otherwise has a neutral opinion of the media content of the media program at that time.

As is shown in FIG. 1E, numbers of each type of interaction 192, 194, 196 received from listeners or other users, e.g., positive interactions, negative interactions, or neutral interactions, are determined at given times during the playing of the media program. For example, as is shown in FIG. 1E, the positive interactions 192, or interactions indicating positive opinions, were received at a substantially constant, linear rate for the first eight to nine minutes of the media program before increasing significantly after approximately nine minutes. The significant increase in the number of positive interactions 192 indicates that many listeners to the media program held a positive opinion of the media content being played at that time. The number of the positive interactions 192 remained substantially constant for approximately six minutes, until another significant increase in the number of positive interactions 192 was observed after approximately sixteen to seventeen minutes, and remained substantially constant again for approximately eight more minutes, until yet another significant increase in the number of positive interactions 192 was observed after approximately twenty-six to twenty-seven minutes. The significant increases in the number of positive interactions 192 also indicate that many listeners to the media program held positive opinions of the media content being played at those times.

Similarly, as is also shown in FIG. 1E, throughout the first three minutes of the media program, the negative interactions 194, or interactions indicating negative opinions, were received at a substantially constant, linear rate before increasing significantly after approximately four minutes. The significant increase in the number of negative interactions 194 indicates that many listeners to the media program held a negative opinion of the media content being played at that time. The number of negative interactions 194 remained substantially constant for approximately fourteen minutes, until another significant increase in the number of negative interactions 194 was observed after approximately 18 minutes, and remained substantially constant again for approximately five more minutes, until yet another significant increase in the number of negative interactions 194 was observed after approximately 24 minutes. The significant increases in the number of negative interactions 194 also indicate that many listeners to the media program held negative opinions of the media content being played at those times.

Finally, as is further shown in FIG. 1E, throughout the first ten minutes of the media program, the neutral interactions 196, or interactions indicating opinions that are neither positive nor negative, were received at a substantially constant, linear rate before remaining constant for approximately eight minutes. The number of neutral interactions 196 began to increase again for approximately five minutes at a substantially constant, linear rate before remaining constant for approximately eight more minutes.

In accordance with implementations of the present disclosure, and as is shown in FIG. 1E, points 155-1, 155-2, 155-3, 155-4 during the media program when listeners express their opinions regarding the media program at their greatest rates or frequencies, or at rates or frequencies that exceed one or more thresholds, may be identified based on the numbers of interactions 192, 194, 196 and the times at which such interactions are received with respect to the media program. In particular, durations $\Delta t_1$, $\Delta t_2$, $\Delta t_3$, $\Delta t_4$ during which listeners interact with the media program at the greatest rates or frequencies may be determined by modeling the interactions 192, 194, 196 as such interactions are received, e.g., according to one or more differential calculus techniques.

Alternatively, the interactions 192, 194, 196 and times at which the interactions 192, 194, 196 were received may be provided to a machine learning model as inputs, and the points 155-1, 155-2, 155-3, 155-4 or the durations $\Delta t_1$, $\Delta t_2$, $\Delta t_3$, $\Delta t_4$ may be identified based on outputs received from the machine learning model. In some implementations, the machine learning model may be a multi-armed bandit, an artificial neural network, or any other machine learning model.

In some implementations, the points 155-1, 155-2, 155-3, 155-4 or the durations $\Delta t_1$, $\Delta t_2$, $\Delta t_3$, $\Delta t_4$ may be identified based on aggregate numbers of interactions, e.g., total numbers of positive, negative or neutral interactions received from listeners, or rates or frequencies at which all such interactions are received from listeners. Alternatively, in some implementations, the points 155-1, 155-2, 155-3, 155-4 or the durations $\Delta t_1$, $\Delta t_2$, $\Delta t_3$, $\Delta t_4$ may be identified by characterizing feedback such as emotions or opinions represented by such interactions, e.g., as positive, negative, or neutral in nature, or in any other basis, and selecting the points 155-1, 155-2, 155-3, 155-4 or the durations $\Delta t_1$, $\Delta t_2$, $\Delta t_3$, $\Delta t_4$ corresponding to the greatest rates of change or most significant moments of emotional response or opinions expressed by the listeners.

Figure 1F:
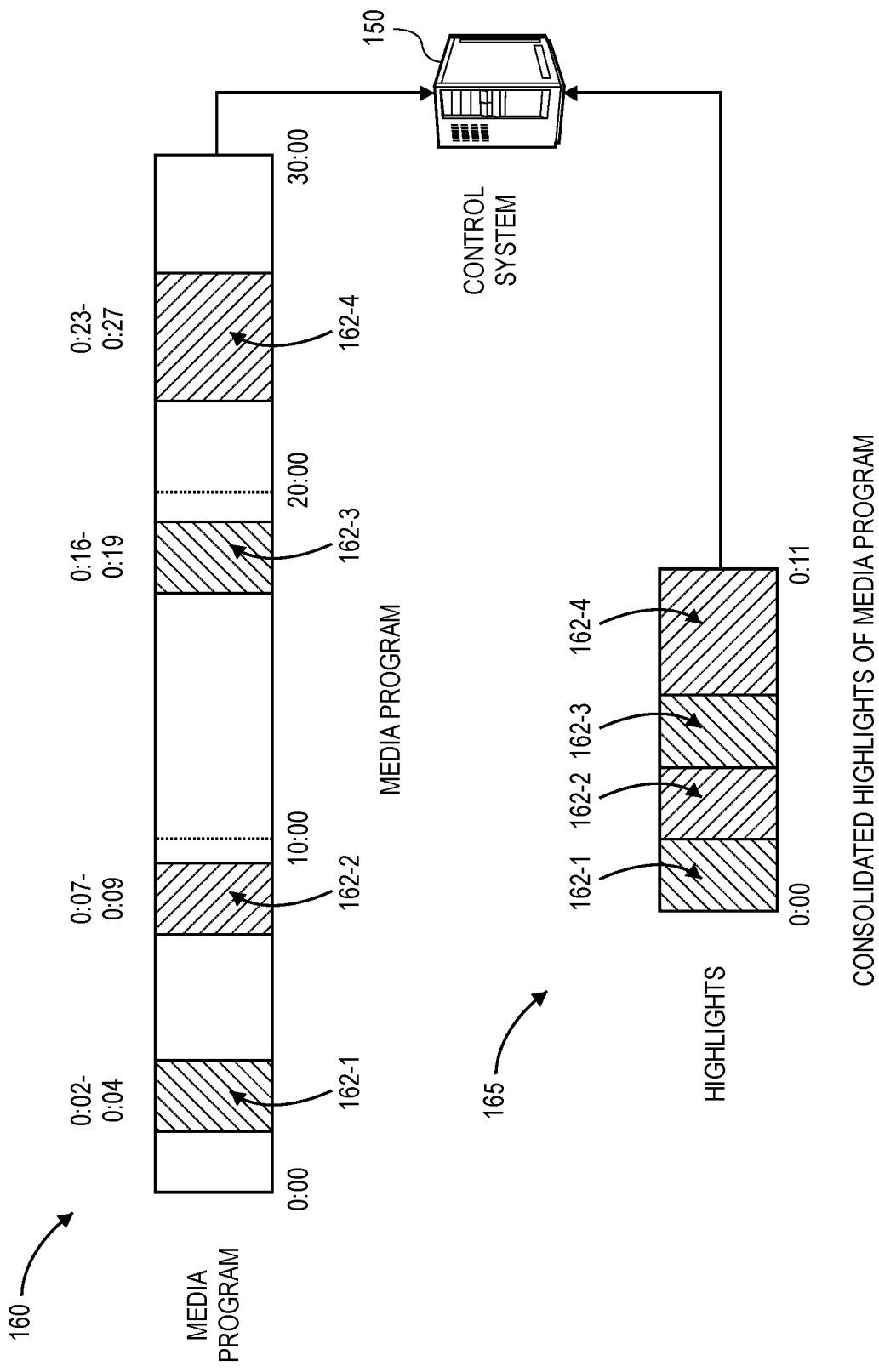

As is shown in FIG. 1F, once a media program 160 (e.g., the interview and/or commentary by the creator 110 and the listener 180-2) has concluded, the media program 160 may be stored in one or more data stores by the control system 150, in any physical or virtual location. Furthermore, as is also shown in FIG. 1F, points during the media program 160 corresponding to the points 155-1, 155-2, 155-3, 155-4 at which interactions were received at the greatest rates or frequencies as shown in FIG. 1E may be identified, and portions 162-1, 162-2, 162-3, 162-4 corresponding to the durations $\Delta t_1$, $\Delta t_2$, $\Delta t_3$, $\Delta t_4$ during which listeners interacted with the media program at the greatest rates or frequencies as also shown in FIG. 1E may be determined. The portions 162-1, 162-2, 162-3, 162-4 may represent highlights of the media program 160, or portions of the media program 160 that are determined to be most interesting to listeners based on the interactions received from their respective devices.

Additionally, as is also shown in FIG. 1F, a consolidated media program 165 may be formed by mixing or otherwise combining the portions 162-1, 162-2, 162-3, 162-4 of the media program 160, and the consolidated media program 165 may also be stored in one or more data stores by the control system 150.

Figure 1G:
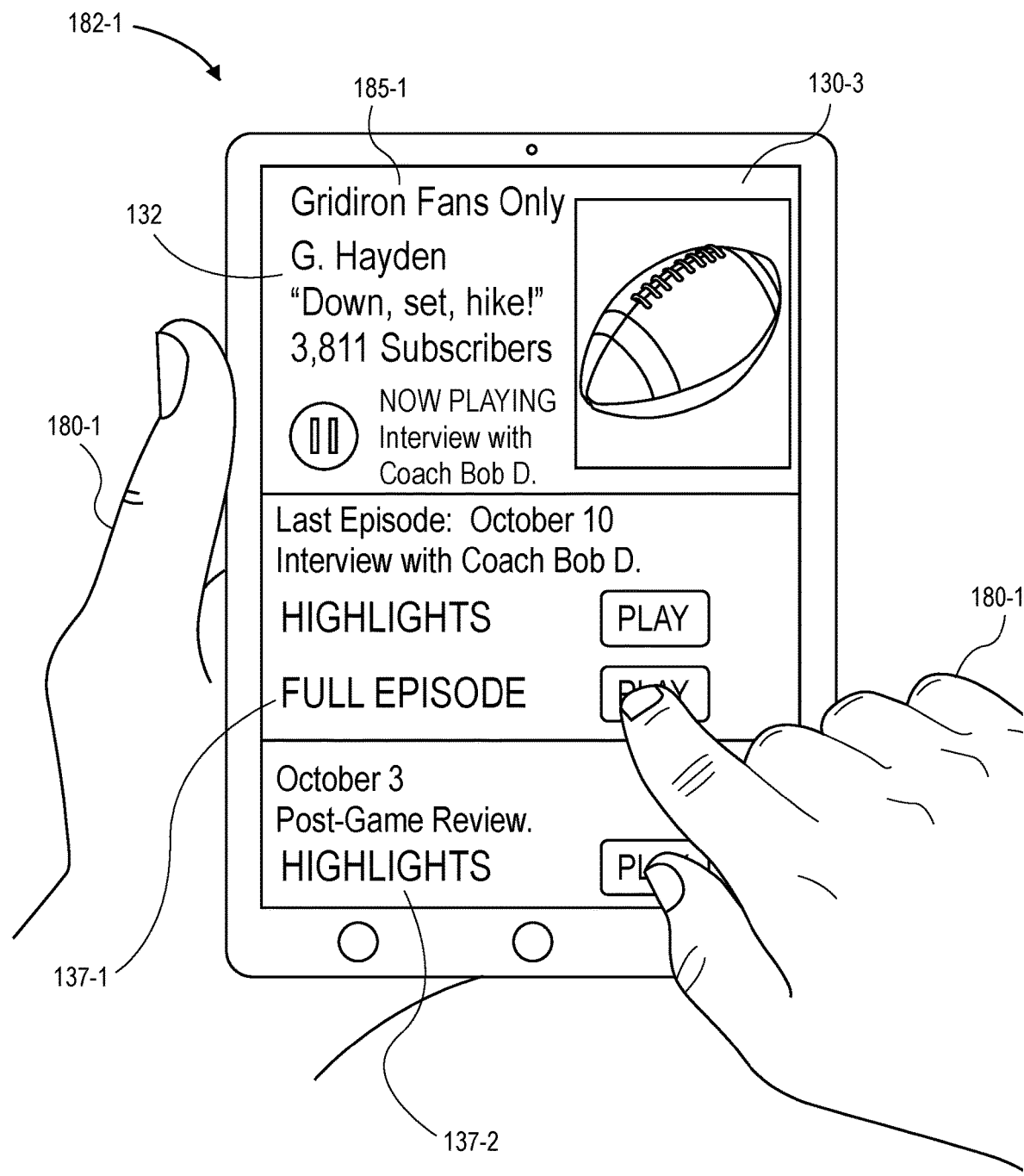

As is shown in FIG. 1G, after the media program 160 has concluded, and after the media program 160 and the consolidated media program 165 have been stored by the control system 150, one or more listeners (or other individuals) may elect to stream or otherwise access either the media program 160 or the consolidated media program 165 from their respective devices. For example, as is shown in FIG. 1G, a user interface 130-3 rendered on the display 185-1 of the mobile device 182-1 of the listener 180-1 includes one or more sections 137-1, 137-2 of selectable elements or features that, when selected, permit the listener 180-1 to retrieve media programs or consolidated media programs in a pre-recorded format (e.g., "on demand"). Upon selecting an element or feature corresponding to the consolidated media program 165, the control system 150 may cause media content of the consolidated media program 165, e.g., the portions 162-1, 162-2, 162-3, 162-4 of the media program 160 shown in FIG. 1F, to be transmitted to the device 182-1 over one or more networks.

Accordingly, the systems and methods of the present disclosure rely on interactions of listeners of media programs to identify portions of the media programs that are most interesting or relevant, and combine one or more of such portions into consolidated media programs that may be accessed independently, in lieu of the media programs, or as alternatives to the media programs.

Any number of individuals associated with a media program may provide interactions during the playing of media content of the media program, or decline to provide any such interactions, including but not limited to listeners (or subscribers) to the media program, creators of the media program, or hosts, guests, or contributors to the media program. For example, a number of listeners that listen to or subscribe to a media program, or receive audio signals from the creator 110 or the control system 150 and provide interactions in reply to the media program, may be any number, such as several, dozens, hundreds, thousands or more listeners.

Moreover, interactions may be received via user interfaces provided on any number of devices of any of number of individuals. Alternatively, where one or more of such devices is not equipped with a display, interactions of listeners may be spoken aloud and received by such devices, and logged accordingly.

Furthermore, any type or form of interaction received from a listener during a playing of a media program, e.g., live or in a prerecorded format, may be interpreted in order to determine an emotion or an opinion of the listener at times with respect to the media program. For example, referring again to FIG. 1C, when a listener plays or pauses the media program, e.g., by interactions with the element 134-6, or fast-forwards or rewinds the media program, e.g., by interactions with other elements (not shown), such interactions may be processed or interpreted to determine whether the listener has a positive emotion or opinion, a negative emotion or opinion, or an emotion or an opinion that is neither positive nor negative at any given time with respect to the media program. Likewise, when a listener enters a chat message into the text box 138-1 or sends the chat message to the creator 110 or other listeners by a selection of the button 138-2, such interactions may be processed or interpreted to determine an emotion or an opinion of the listener at any given time with respect to the media program. Alternatively, when a listener elects to stop the media program, search for another media program, or end the playing of media altogether either permanently or for a period of time may also be processed or interpreted to determine an emotion or an opinion of the listener at any given time with respect to the media program. The systems and methods of the present disclosure are not limited to receiving interactions with interactive features having symbols representative of emotions or opinions, such as the arrows 136-1, 136-2, 136-3 or like interactive features, in accordance with implementations of the present disclosure. Furthermore, in some implementations, an interaction may be received from a listener by any voice-controlled devices or software (e.g., a personal assistant).

Moreover, the systems and methods of the present disclosure are not limited to receiving interactions that may be characterized as "positive," "negative" or "neutral." Rather, interactions received from listeners or other individuals in accordance with implementations of the present disclosure may be characterized in any manner. For example, in some implementations, an emotion or an opinion of a listener may be characterized not only in terms of polarity, i.e., whether the chat message is generally positive, negative or neutral, but also in terms of grades or degrees. An interaction of a listener may be classified as "happy" or "sad," "inspirational" or "depressing," "peaceful" or "disturbed," "angry" or "content," or by any other identifier or pair of identifiers, and to any extent or degree thereof, which may be expressed in one or more qualitative or quantitative terms.

Media content that may be included in a media program includes, but need not be limited to, one or more songs or other music files from a music catalog, repository or streaming service, one or more advertisements of items, goods or services, or one or more news, sports or weather programs, which may be live or previously recorded, as well as voices of a creator or one or more guests, such as musicians, celebrities, personalities, athletes, politicians, or artists, or any listeners to the media program. A control system, or any associated conference systems, broadcast systems or mixing systems, may establish or terminate connections with a creator, with any sources of media content, or with any number of listeners, to compile and efficiently transmit the media program over digital channels (e.g., web-based or application-based), to any number of systems or devices of any form.

One or more of the embodiments disclosed herein may overcome limitations of existing systems and methods for presenting media programs or other content, e.g., radio programs, to listeners. Unbounded by traditional frequency bands or broadcast protocols, the systems and methods of the present disclosure may receive designations of media content from a creator of a media program, e.g., in a broadcast plan, and the media program may be transmitted over one or more networks to any number of listeners in any locations and by way of any devices. Creators of media programs may designate one or more types or files of media content to be broadcast to listeners via a user interface rendered on a display or by any type or form of computer device, in accordance with a broadcast plan or other schedule. A control system, or a mixing system, a conference system or a broadcast system, may retrieve the designated media content from any number of sources, or initiate or control the designated media content to any number of listeners, by opening one or more connections between computer devices or systems of the creator and computer devices or systems of the sources or listeners.

In some implementations of the present disclosure, one-way communication channels, or unidirectional channels, may be established between a broadcast system (or a control system) and any number of other computer devices or systems. For example, broadcast channels may be established between a broadcast system (or a control system) and sources of media or other content, or between a broadcast system (or a control system) and devices of any number of listeners, for providing media content. Two-way communication channels, or bidirectional channels, may also be established between a conference system (or a control system) and any number of other computer devices or systems. For example, a conference channel may be established between a computer device or system of a creator or another source of media and a conference system (or a control system). Furthermore, one-way or two-way communication channels may be established between a conference system and a mixing system, or between a mixing system and a broadcast system, as appropriate.

Communication channels may be established in any manner, in accordance with implementations of the present disclosure. Those of ordinary skill in the pertinent arts will recognize that computer networks, such as the Internet, may operate based on a series of protocols that are layered on top of one another. Such protocols may be collectively referred to as an Internet Protocol suite (or IP suite). One underlying layer of the IP suite is sometimes referred to in the abstract as a link layer, e.g., physical infrastructure, or wired or wireless connections between one or more networked computers or hosts. A second layer atop the link layer is a network layer, which is sometimes called an Internet Protocol layer, and is a means by which data is routed and delivered between two disparate physical locations.

A third layer in an IP suite is a transport layer, which may be analogized to a recipient's mailbox. The transport layer may divide a host's network interface into one or more channels, or ports, with each host having as many ports available for establishing simultaneous network connections. A socket is a combination of an IP address describing a host for which data is intended and a port number indicating a channel on the host to which data is directed. A socket is used by applications running on a host to listen for incoming data and send outgoing data. One standard transport layer protocol is the Transmission Control Protocol, or TCP, which is full-duplex, such that connected hosts can concurrently send and receive data. A fourth and uppermost layer in the IP suite is referred to as an application layer. Within the application layer, familiar protocols such as Hypertext Transfer Protocol (or "HTTP"), are found. HTTP is built on a request/response model in which a client sends a request to a server, which may be listening for such requests, and the server parses the request and issues an appropriate response, which may contain a network resource.

One application-layer protocol for communicating between servers and clients is called WebSocket, which provides TCP-like functionality at the application layer. Like TCP, WebSocket is full-duplex, such that once an underlying connection is established, a server may, of its own volition, push data to client devices with which the server is connected, and clients may continue to send messages to the server over the same channel. Additionally, a pure server-push technology is also built into HTML5, one version of Hypertext Markup Language. This technology, which is known as Server-Sent Events (or SSE), or operates over standard HTTP, and is a novel use of an existing application-layer protocol. Server-Sent Events works by essentially sending partial responses to an initial HTTP request, such that a connection remains open, enabling further data to be sent at a later time. In view of its unidirectional nature, Server-Sent Events is useful in situations in which a server will be generating a steady stream of updates without requiring anything further from a client.

Communications channels of the present disclosure may be associated with any type of content and established computer devices and systems associated with any type of entity, and in accordance with a broadcast plan or sequence of media content, or at the control or discretion of one or more creators. One or more user interfaces rendered by or on a computer system or device may permit a creator to control the synchronization or mixing of media content by the broadcast system or the mixing system. Gestures or other interactions with the user interfaces may be translated into commands to be processed by the broadcast system or the mixing system, e.g., to play a specific song, to insert a specific advertisement, or to take any other relevant actions, such as to adjust a volume or another attribute or parameter of media content. Moreover, a broadcast system or the mixing system may provide any relevant information to a creator via such user interfaces, including information regarding attributes or parameters of media content that was previously played, that is being played, or that is scheduled to be played in accordance with a broadcast plan or during a media program. The broadcast system or the mixing system may further execute one or more instructions in response to rules, which may define or control media content that is to be played at select times during a media program, e.g., to automatically increase or decrease volumes or other attributes or parameters of a voice of a creator, or of other media content from other sources, on any basis. Any rules governing the playing of media content of a media program by the broadcast system or the mixing system may be overridden by a creator, e.g., by one or more gestures or other interactions with a user interface of an application in communication with the broadcast system or the mixing system that may be associated with the playing of the media content or the media program.

Figure 2A:
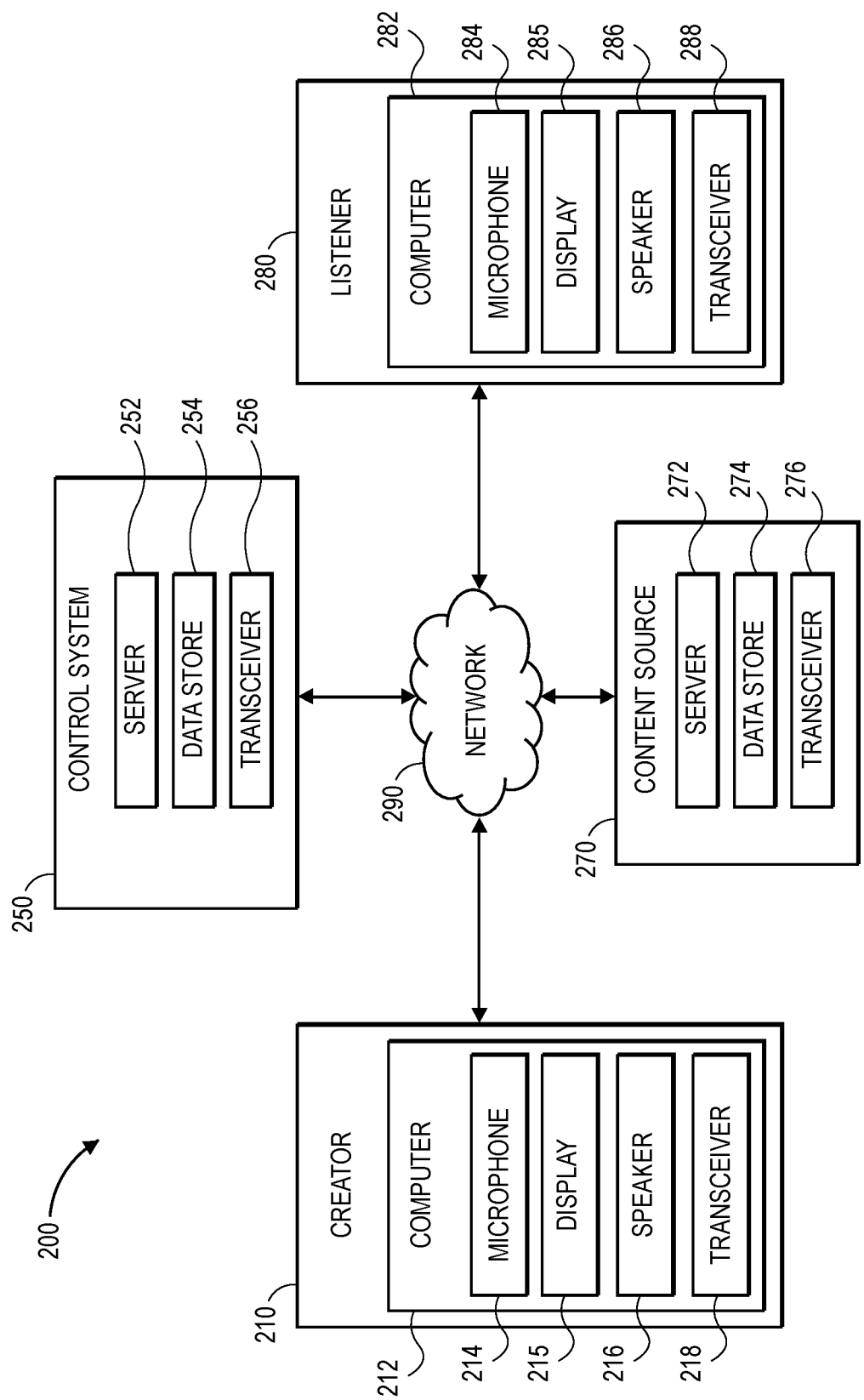
FIGS. 2A and 2B are block diagrams of one system for creating media content streams in accordance with embodiments of the present disclosure.
Figure 2B:
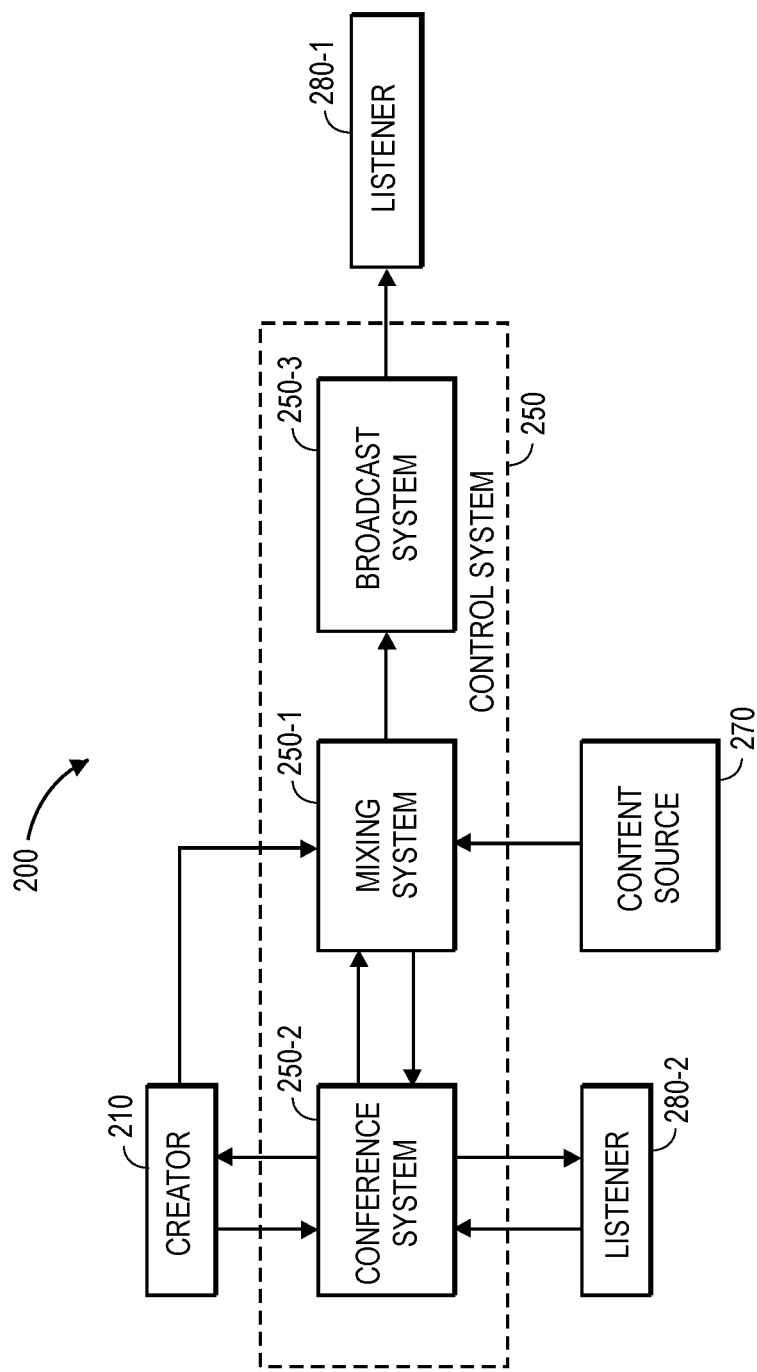

Referring to FIGS. 2A and 2B, block diagrams of components of one system 200 for synchronizing media content streams in accordance with embodiments of the present disclosure is shown. Except where otherwise noted, reference numerals preceded by the number "2" shown in FIG. 2A or FIG. 2B indicate components or features that are similar to components or features having reference numerals preceded by the number "1" shown in FIGS. 1A through 1H.

As is shown in FIG. 2A, the system 200 shown in FIG. 2A includes a creator 210, a control system 250, a content source 270, and a listener 280 that are connected to one another over one or more networks 290.

The creator 210 may be any individual or entity that expresses an interest or an intent in constructing a media program including media content, and providing the media program to the listener 280 over the network 290. As is shown in FIG. 2A, the creator 210 is associated with or operates a computer system 212 having a microphone 214, a display 215, a speaker 216 and a transceiver 218, and any other components.

In some implementations, the computer system 212 may be a mobile device, such as a smartphone, a tablet computer, a wristwatch, or others. In some other implementations, the computer system 212 may be a laptop computer or a desktop computer, or any other type or form of computer. In still other implementations, the computer system 212 may be, or may be a part of, a smart speaker, a television, an automobile, a media player, or any other type or form of system having one or more processors, memory or storage components (e.g., databases or other data stores), or other components.

The microphone 214 may be any sensor or system for capturing acoustic energy, including but not limited to piezoelectric sensors, vibration sensors, or other transducers for detecting acoustic energy, and for converting the acoustic energy into electrical energy or one or more electrical signals. The display 215 may be a television system, a monitor or any other like machine having a screen for viewing rendered video content, and may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. The display 215 may be configured to receive content from any number of sources via one or more wired or wireless connections, e.g., the control system 250, the content source 270 or the listener 280, over the networks 290.

In some implementations, the display 215 may be an interactive touchscreen that may not only display information or data but also receive interactions with the information or data by contact with a viewing surface. For example, the display 215 may be a capacitive touchscreen that operates by detecting bioelectricity from a user, or a resistive touchscreen including a touch-sensitive computer display composed of multiple flexible sheets that are coated with a resistive material and separated by an air gap, such that when a user contacts a surface of a resistive touchscreen, at least two flexible sheets are placed in contact with one another.

The speaker 216 may be any physical components that are configured to convert electrical signals into acoustic energy such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters.

The transceiver 218 may be configured to enable the computer system 212 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 218 may further include or be in communication with one or more input/output (or "I/O") interfaces, network interfaces and/or input/output devices, and may be configured to allow information or data to be exchanged between one or more of the components of the computer system 212, or to one or more other computer devices or systems (e.g., other aerial vehicles, not shown) via the network 290. The transceiver 218 may perform any necessary protocol, timing or other data transformations in order to convert data signals from a first format suitable for use by one component into a second format suitable for use by another component. In some embodiments, the transceiver 218 may include support for devices attached through various types of peripheral buses, e.g., variants of the Peripheral Component Interconnect (PCI) bus standard or the Universal Serial Bus (USB) standard. In some other embodiments, functions of the transceiver 218 may be split into two or more separate components.

In some implementations, the computer system 212 may include a common frame or housing that accommodates the microphone 214, the display 215, the speaker 216 and/or the transceiver 218. In some implementations, applications or functions or features described as being associated with the computer system 212 may be performed by a single system. In some other implementations, however, such applications, functions or features may be split among multiple systems. For example, an auxiliary system, such as the ear buds 113 of FIG. 1A, may perform one or more of such applications or functions, or include one or more features, of the computer system 212 or other computer systems or devices described herein, and may exchange any information or data that may be associated with such applications, functions or features with the computer system 212, as necessary. Alternatively, or additionally, the computer system 212 may include one or more power supplies, sensors (e.g., visual cameras or depth cameras), feedback devices (e.g., haptic feedback systems), chips, electrodes, clocks, boards, timers or other relevant features (not shown).

In some implementations, the computer system 212 may be programmed or configured to render one or more user interfaces on the display 215 or in any other manner, e.g., by a browser or another application. The computer system 212 may receive one or more gestures or other interactions with such user interfaces, and such gestures or other interactions may be interpreted to generate one or more instructions or commands that may be provided to one or more of the control system 250, the content source 270 or the listener 280. Alternatively, or additionally, the computer system 212 may be configured to present one or more messages or information to the creator 210 in any other manner, e.g., by voice, and to receive one or more instructions or commands from the creator 210, e.g., by voice.

The control system 250 may be any single system, or two or more of such systems, that is configured to establish or terminate channels or connections with or between the creator 210, the content source 270 or the listener 280, to initiate a media program, or to control the receipt and transmission of media content from one or more of the creator 210, the content source 270 or the listener 280 to the creator 210, the content source 270 or the listener 280. The control system 250 may operate or include a networked computer infrastructure, including one or more physical computer servers 252 and data stores 254 (e.g., databases) and one or more transceivers 256, that may be associated with the receipt or transmission of media or other information or data over the network 290. The control system 250 may also be provided in connection with one or more physical or virtual services configured to manage or monitor such files, as well as one or more other functions. The servers 252 may be connected to or otherwise communicate with the data stores 254 and may include one or more processors. The data stores 254 may store any type of information or data, including media files or any like files containing multimedia (e.g., audio and/or video content), for any purpose. The servers 252 and/or the data stores 254 may also connect to or otherwise communicate with the networks 290, through the sending and receiving of digital data.

In some implementations, the control system 250 may be independently provided for the exclusive purpose of managing the monitoring and distribution of media content. Alternatively, the control system 250 may be operated in connection with one or more physical or virtual services configured to manage the monitoring or distribution of media files, as well as one or more other functions. Additionally, the control system 250 may include any type or form of systems or components for receiving media files and associated information, data or metadata, e.g., over the networks 290. For example, the control system 250 may receive one or more media files via any wired or wireless means and store such media files in the one or more data stores 254 for subsequent processing, analysis and distribution. In some embodiments, the control system 250 may process and/or analyze media files, such as to add or assign metadata, e.g., one or more tags, to media files.

The control system 250 may further broadcast, air, stream or otherwise distribute media files maintained in the data stores 254 to one or more listeners, such as the listener 280 or the creator 210, over the networks 290. Accordingly, in addition to the server 252, the data stores 254, and the transceivers 256, the control system 250 may also include any number of components associated with the broadcasting, airing, streaming or distribution of media files, including but not limited to transmitters, receivers, antennas, cabling, satellites, or communications systems of any type or form. Processes for broadcasting, airing, streaming and distribution of media files over various networks are well known to those skilled in the art of communications and thus, need not be described in more detail herein.

The content source 270 may be a source, repository, bank, or other facility for receiving, storing or distributing media content, e.g., in response to one or more instructions or commands from the control system 250. The content source 270 may receive, store or distribute media content of any type or form, including but not limited to advertisements, music, news, sports, weather, or other programming. The content source 270 may include, but need not be limited to, one or more servers 272, data stores 274 or transceivers 276, which may have any of the same attributes or features of the servers 252, data stores 254 or transceivers 256, or one or more different attributes or features.

In some embodiments, the content source 270 may be an Internet-based streaming content and/or media service provider that is configured to distribute media over the network 290 to one or more general purpose computers or computers that are dedicated to a specific purpose.

For example, in some embodiments, the content source 270 may be associated with a television channel, network or provider of any type or form that is configured to transmit media files over the airwaves, via wired cable television systems, by satellite, over the Internet, or in any other manner. The content source 270 may be configured to generate or transmit media content live, e.g., as the media content is captured in real time or in near-real time, such as following a brief or predetermined lag or delay, or in a pre-recorded format, such as where the media content is captured or stored prior to its transmission to one or more other systems. For example, the content source 270 may include or otherwise have access to any number of microphones, cameras or other systems for capturing audio, video or other media content or signals. In some embodiments, the content source 270 may also be configured to broadcast or stream one or more media files for free or for a one-time or recurring fees. In some embodiments, the content source 270 may be associated with any type or form of network site (e.g., a web site), including but not limited to news sites, sports sites, cultural sites, social networks or other sites, that streams one or more media files over a network. In essence, the content source 270 may be any individual or entity that makes media files of any type or form available to any other individuals or entities over one or more networks 290.

The listener 280 may be any individual or entity having access to one or more computer devices 282, e.g., general purpose or special purpose devices, who has requested (e.g., subscribed to) media content associated with one or more media programs over the network 290. For example, the computer devices 282 may be at least a portion of an automobile, a desktop computer, a laptop computer, a media player, a smartphone, a smart speaker, a tablet computer, a television, or a wristwatch, or any other like machine that may operate or access one or more software applications, and may be configured to receive media content, and present the media content to the listener 280 by one or more speakers, displays or other feedback devices. The computer device 282 may include a microphone 284, a display 285, a speaker 286, a transceiver 288, or any other components described herein, which may have any of the same attributes or features of the computer device 212, the microphone 214, the display 215, the speaker 216 or the transceiver 218 described herein, or one or more different attributes or features. In accordance with the present disclosure, a listener 280 that requests to receive media content associated with one or more media programs may also be referred to as a "subscriber" to such media programs or media content.

Those of ordinary skill in the pertinent arts will recognize that the computer devices 212, 282 may include any number of hardware components or operate any number of software applications for playing media content received from the control system 250 and/or the media sources 270, or from any other systems or devices (not shown) connected to the network 290.

Moreover, those of ordinary skill in the pertinent arts will further recognize that, alternatively, in some implementations, the computer device 282 need not be associated with a specific listener 280. For example, the computer device 282 may be provided in a public place, beyond the control of the listener 280, e.g., in a bar, a restaurant, a transit station, a shopping center, or elsewhere, where any individuals may receive one or more media programs.

The networks 290 may be or include any wired network, wireless network, or combination thereof, and may comprise the Internet, intranets, broadcast networks, cellular television networks, cellular telephone networks, satellite networks, or any other networks, for exchanging information or data between or among the computer systems or devices of the creator 210, the control system 250, the media source 270 or the listener 280, or others (not shown). In addition, the network 290 may be or include a personal area network, local area network, wide area network, cable network, satellite network, cellular telephone network, or combination thereof, in whole or in part. The network 290 may also be or include a publicly accessible network of linked networks, possibly operated by various distinct parties, such as the Internet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

Although the system 200 shown in FIG. 2A shows boxes for one creator 210, one control system 250, one media source 270, one listener 280, and one network 290, those of ordinary skill in the pertinent arts will recognize that any number of creators 210, broadcast systems 250, media sources 270, listeners 280 or networks 290 may be utilized to transmit, receive, access, hear, or view media content provided in accordance with implementations of the present disclosure. Moreover, the computer devices 212, 252, 272, 282 may include all or fewer of the components shown in FIG. 2A or perform all or fewer of the tasks or functions described herein. Tasks or functions described as being executed or performed by a single system or device associated with the creator 210, the control system 250, the media source 270 or the listener 280 may be executed or performed by multiple systems or devices associated with each of the creator 210, the control system 250, the media source 270 or the listener 280. For example, the tasks or functions described herein as being executed or performed by the control system 250 may be performed by a single system, or by separate systems for establishing two-way connections with the creator 210 or any number of media sources 270, or any other systems, e.g., a mixing system, or for establishing one-way connections with any number of media sources 270 or any number of listeners 280 and transmitting data representing media content, e.g., a broadcast system, from such media sources 270 to such listeners 280. Moreover, two or more creators 210 may collaborate on the construction of a media program.

In some implementations, one or more of the tasks or functions described as being executed or performed by the control system 250 may be performed by multiple systems. For example, as is shown in FIG. 2B, the system 200 may include a mixing system 250-1, a conference system 250-2 and a broadcast system 250-3 that may perform one or more of the tasks or functions described herein as being executed or performed by the control system 250.

As is further shown in FIG. 2B, the mixing system 250-1 may be configured to receive data from the conference system 250-2, as well as from one or more content sources 270. For example, in some implementations, the conference system 250-2 may also be configured to establish two-way communications channels with computer devices or systems associated with the creator 210 (or any number of creators) as well as a listener 280-2 (or any number of listeners) or other authorized host, guests, or contributors to a media program associated with one or more of the creators 210, and form a "conference" including each of such devices or systems. The conference system 250-2 may receive data representing media content such as audio signals in the form of words spoken or sung by one or more of the creator 210, the listener 280-2, or other entities connected to the conference system 250-2, or music or other media content played by the one or more of the creator 210, the listener 280-2, or such other entities, and transmit data representing the media content or audio signals to each of the other devices or systems connected to the conference system 250-2.

In some implementations, the mixing system 250-1 may also be configured to establish a two-way communications channel with the conference system 250-2, thereby enabling the mixing system 250-1 to receive data representing audio signals from the conference system 250-2, or transmit data representing audio signals to the conference system 250-2. For example, in some implementations, the mixing system 250-1 may act as a virtual participant in a conference including the creator 210 and any listeners 280-2, and may receive data representing audio signals associated with any participants in the conference, or provide data representing audio signals associated with media content of the media program, e.g., media content received from any of the content sources 270, to such participants.

The mixing system 250-1 may also be configured to establish a one-way communications channel with the content source 270 (or with any number of content sources), thereby enabling the mixing system 250-1 to receive data representing audio signals corresponding to advertisements, songs or media files, news programs, sports programs, weather reports or any other media files, which may be live or previously recorded, from the content source 270. The mixing system 250-1 may be further configured to establish a one-way communications channel with the broadcast system 250-3, and to transmit data representing media content received from the creator 210 or the listener 280-2 by way of the conference channel 250-2, or from any content sources 270, to the broadcast system 250-3 for transmission to any number of listeners 280-1.

The mixing system 250-1 may be further configured to receive information or data from one or more devices or systems associated with the creator 210, e.g., one or more instructions for operating the mixing system 250-1. For example, in some implementations, the mixing system 250-1 may be configured to cause any number of connections to be established between devices or systems and one or more of the conference system 250-2 or the broadcast system 250-3, or for causing data representing media content of any type or form to be transmitted to one or more of such devices or systems in response to such instructions. In some implementations, the mixing system 250-1 may also be configured to initiate or modify the playing of media content, such as by playing, pausing or stopping the media content, advancing (e.g., "fast-forwarding") or rewinding the media content, increasing or decreasing levels of volume of the media content, or setting or adjusting any other attributers or parameters (e.g., treble, bass, or others) of the media content, in response to such instructions or automatically.

The broadcast system 250-3 may be configured to establish one-way communications channels with any number of listeners 280-1, and to transmit data representing media content received from the mixing system 250-1 to each of such listeners 280-1.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The computer devices 212, 282 or the servers 252, 272, and any associated components, may use any web-enabled or Internet applications or features, or any other client-server applications or features including E-mail or other messaging techniques, to connect to the networks 290, or to communicate with one another, such as through short or multimedia messaging service (SMS or MMS) text messages. For example, the computer devices 212, 282 or the servers 252, 272 may be configured to transmit information or data in the form of synchronous or asynchronous messages to one another in real time or in near-real time, or in one or more offline processes, via the networks 290. Those of ordinary skill in the pertinent art would recognize that the creator 210, the control system 250 (or the mixing system 250-1, the conference system 250-2, or the broadcast system 250-3), the media source 270 or the listener 280 (or the listeners 280-1, 280-2) may include or operate any of a number of computing devices that are capable of communicating over the networks 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as computer devices 212, 282 or the servers 252, 272, or to any other computers or control systems utilized by the creator 210, the control system 250 (or the mixing system 250-1, the conference system 250-2, or the broadcast system 250-3), the media source 270 or the listener 280 (or the listeners 280-1, 280-2), and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 290.

Figure 3:
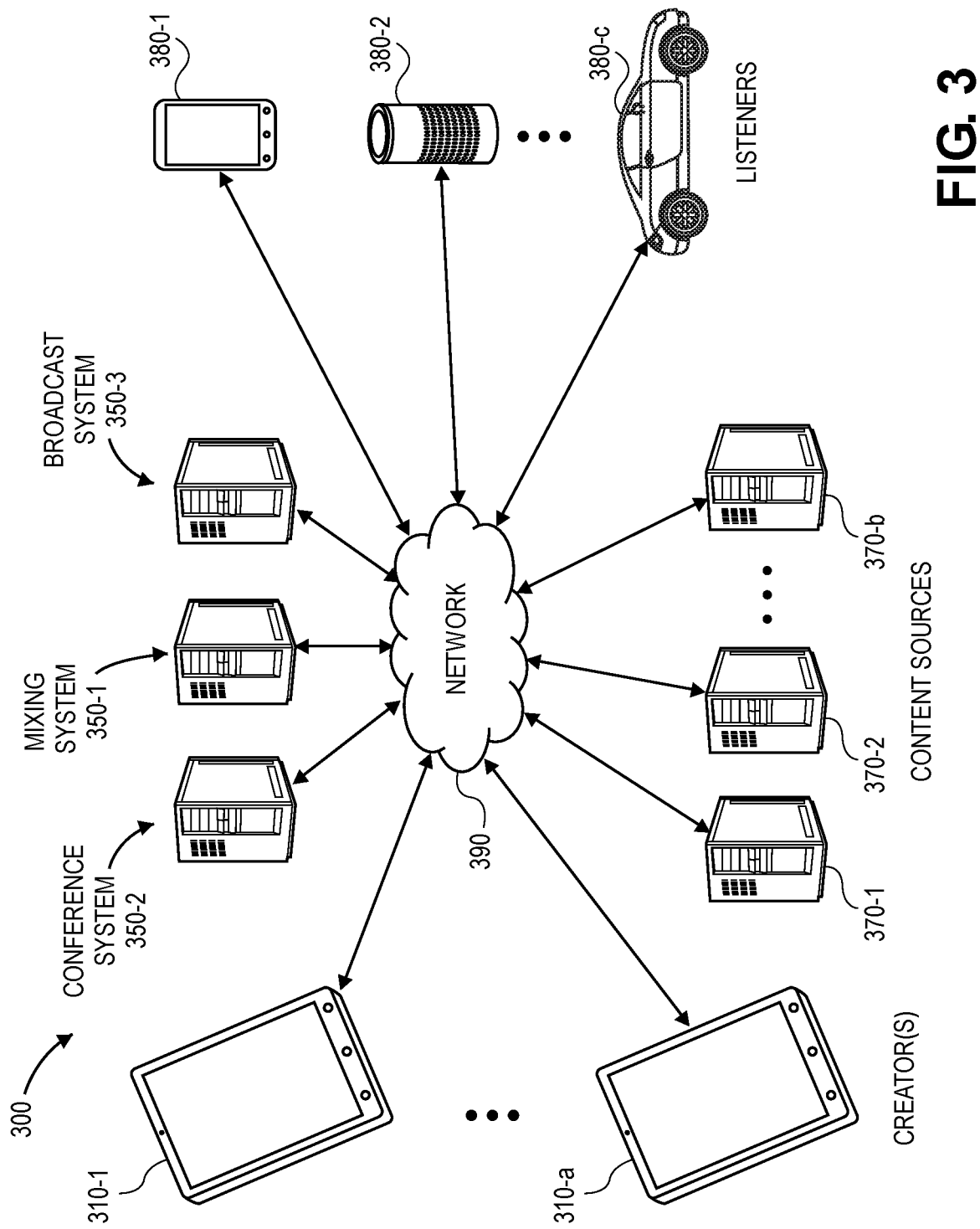
FIG. 3 is a view of aspects of one system for creating media content streams in accordance with embodiments of the present disclosure.

Referring to FIG. 3, a view of aspects of one system for synchronizing media content streams in accordance with embodiments of the present disclosure is shown. Except where otherwise noted, reference numerals preceded by the number "3" shown in FIG. 3 indicate components or features that are similar to components or features having reference numerals preceded by the number "2" shown in FIG. 2A or FIG. 2B or by the number "1" shown in FIGS. 1A through 1H. As is shown in FIG. 3, the system 300 includes computer systems or devices of a plurality of creators 310-1 . . . 310-a, a mixing system 350-1, a conference system 350-2, a broadcast system 350-3, a plurality of content sources 370-1, 370-2 . . . 370-b and a plurality of listeners 380-1, 380-2 . . . 380-c that are connected to one another over a network 390, which may include the Internet in whole or in part.

The creators 310-1 . . . 310-a may operate a computer system or device having one or more microphones, an interactive display, one or more speakers, one or more processors and one or more transceivers configured to enable communication with one or more other computer systems or devices. In some implementations, the creators 310-1 . . . 310-a may operate a smartphone, a tablet computer or another mobile device, and may execute interactions with one or more user interfaces rendered thereon, e.g., by a mouse, a stylus, a touchscreen, a keyboard, a trackball, or a trackpad, as well as any voice-controlled devices or software (e.g., a personal assistant). Interactions with the user interfaces may be interpreted and transmitted in the form of instructions or commands to the mixing system 350-1, the conference system 350-2 or the broadcast system 350-3. Alternatively, the creators 310-1 . . . 310-a may operate any other computer system or device, e.g., a laptop computer, a desktop computer, a smart speaker, a media player, a wristwatch, a television, an automobile, or any other type or form of system having one or more processors, memory or storage components (e.g., databases or other data stores), or other components.

Additionally, the mixing system 350-1 may be any server or other computer system or device configured to receive information or data from the creators 310-1 . . . 310-a, or any of the listeners 380-1, 380-2 . . . 380-c, e.g., by way of the conference system 350-2, or from any of the media sources 370-1, 370-2 . . . 370-b over the network 390. The mixing system 350-1 may be further configured to transmit any information or data to the broadcast system 350-3 over the network 390, and to cause the broadcast system 350-3 to transmit any of the information or data to any of the listeners 380-1, 380-2 . . . 380-c, in accordance with a broadcast plan (or a sequence of media content, or another schedule), or at the direction of the creators 310-1 . . . 310-a. The mixing system 350-1 may also transmit or receive information or data along such communication channels, or in any other manner. The operation of the mixing system 350-1, e.g., the establishment of connections, or the transmission and receipt of data via such connections, may be subject to the control or discretion of any of the creators 310-1 . . . 310-*a*.

In some implementations, the mixing system 350-1 may receive media content from one or more of the media sources 370-1, 370-2 . . . 370-*b*, and cause the media content to be transmitted to one or more of the creators 310-1 . . . 310-*a* or the listeners 380-1, 380-2 . . . 380-*c* by the broadcast system 350-3. In some other implementations, the mixing system 350-1 may receive media content from one or more of the media sources 370-1, 370-2 . . . 370-*b*, and mix, or combine, the media content with any media content received from the creators 310-1 . . . 310-*a* or any of the listeners 380-1, 380-2 . . . 380-*c*, before causing the media content to be transmitted to one or more of the creators 310-1 . . . 310-*a* or the listeners 380-1, 380-2 . . . 380-*c* by the conference system 350-2 or the broadcast system 350-3. For example, in some implementations, the mixing system 350-1 may receive media content (e.g., audio content and/or video content) captured live by one or more sensors of one or more of the media sources 370-1, 370-2 . . . 370-*b*, e.g., cameras and/or microphones provided at a location of a sporting event, or any other event, and mix that media content with any media content received from any of the creators 310-1 . . . 310-*a* or any of the listeners 380-1, 380-2 . . . 380-*c*. In such embodiments, the creators 310-1 . . . 310-*a* may act as sportscasters, news anchors, weathermen, reporters or others, and may generate a media program that combines audio or video content captured from a sporting event or other event of interest, along with audio or video content received from one or more of the creators 310-1 . . . 310-*a* or any of the listeners 380-1, 380-2 . . . 380-*c* before transmitting causing the media program to be transmitted to the listeners 380-1, 380-2 . . . 380-*c* by the conference system 350-2 or the broadcast system 350-3.

In some implementations, the conference system 350-2 may establish two-way communications channels between any of the creators 310-1 . . . 310-*a* and, alternatively, any of the listeners 380-1, 380-2 . . . 380-*c*, who may be invited or authorized to participate in a media program, e.g., by providing media content in the form of spoken or sung words, music, or any media content, subject to the control or discretion of the creators 310-1 . . . 310-*a*. Devices or systems connected to the conference system 350-2 may form a "conference" by transmit or receive information or data along such communication channels, or in any other manner. The operation of the mixing system 350-1, e.g., the establishment of connections, or the transmission and receipt of data via such connections, may be subject to the control or discretion of the creators 310-1 . . . 310-*a*. In some implementations, the mixing system 350-1 may effectively act as a virtual participant in such a conference, by transmitting media content received from any of the media sources 370-1, 370-2 . . . 370-*b* to the conference system 350-2 for transmission to any devices or systems connected thereto, and by receiving media content from any of such devices or systems by way of the conference system 350-2 and transmitting the media content to the broadcast system 350-3 for transmission to any of the listeners 380-1, 380-2 . . . 380-*c*.

Likewise, the broadcast system 350-3 may be any server or other computer system or device configured to receive information or data from the mixing system 350-1, or transmit any information or data to any of the listeners 380-1, 380-2 . . . 380-*c* over the network 390. In some implementations, the broadcast system 350-3 may establish one-way communications channels with the mixing system 350-1 or any of the listeners 380-1, 380-2 . . . 380-*c* in accordance with a broadcast plan (or a sequence of media content, or another schedule), or at the direction of the creators 310-1 . . . 310-*a*. The broadcast system 350-3 may also transmit or receive information or data along such communication channels, or in any other manner. The operation of the broadcast system 350-3, e.g., the establishment of connections, or the transmission of data via such connections, may be subject to the control or discretion of the creators 310-1 . . . 310-*a*.

The content sources 370-1, 370-2 . . . 370-*b* may be servers or other computer systems having media content stored thereon, or access to media content, that are configured to transmit media content to the creators 310-1 . . . 310-*a* or any of the listeners 380-1, 380-2 . . . 380-*c* in response to one or more instructions or commands from the creators 310-1 . . . 310-*a* or the mixing system 350-1. The media content stored on or accessible to the content sources 370-1, 370-2 . . . 370-*b* may include one or more advertisements, songs or media files, news programs, sports programs, weather reports or any other media files, which may be live or previously recorded. The number of content sources 370-1, 370-2 . . . 370-*b* that may be accessed by the mixing system 350-1, or the types of media content stored thereon or accessible thereto, is not limited.

The listeners 380-1, 380-2 . . . 380-*c* may also operate any type or form of computer system or device configured to receive and present media content, e.g., at least a portion of an automobile, a desktop computer, a laptop computer, a media player, a smartphone, a smart speaker, a tablet computer, a television, or a wristwatch, or others.

The mixing system 350-1, the conference system 350-2 or the broadcast system 350-3 may establish or terminate connections with the creators 310-1 . . . 310-*a*, with any of the content sources 370-1, 370-2 . . . 370-*b*, or with any of the listeners 380-1, 380-2 . . . 380-*c*, as necessary, to compile and seamlessly transmit media programs over digital channels (e.g., web-based or application-based), to devices of the creators 310-1 . . . 310-*a* or the listeners 380-1, 380-2 . . . 380-*c* in accordance with a broadcast plan, or subject to the control of the creators 310-1 . . . 310-*a*. Furthermore, in some implementations, one or more of the listeners 380-1, 380-2 . . . 380-*c*, e.g., musicians, celebrities, personalities, athletes, politicians, or artists, may also be content sources. For example, where the broadcast system 350-3 has established one-way channels, e.g., broadcast channels, with any of the listeners 380-1, 380-2 . . . 380-*c*, the mixing system 350-1 may terminate one of the one-way channels with one of the listeners 380-1, 380-2 . . . 380-*c*, and cause the conference system 350-2 to establish a two-directional channel with that listener, thereby enabling that listener to not only receive but also transmit media content to the creators 310-1 . . . 310-*a* or any of the other listeners.

Those of ordinary skill in the pertinent arts will recognize that any of the tasks or functions described above with respect to the mixing system 350-1, the conference system 350-2 or the broadcast system 350-3 may be performed by a single device or system, e.g., a control system, or by any number of devices or systems.

Figure 4:
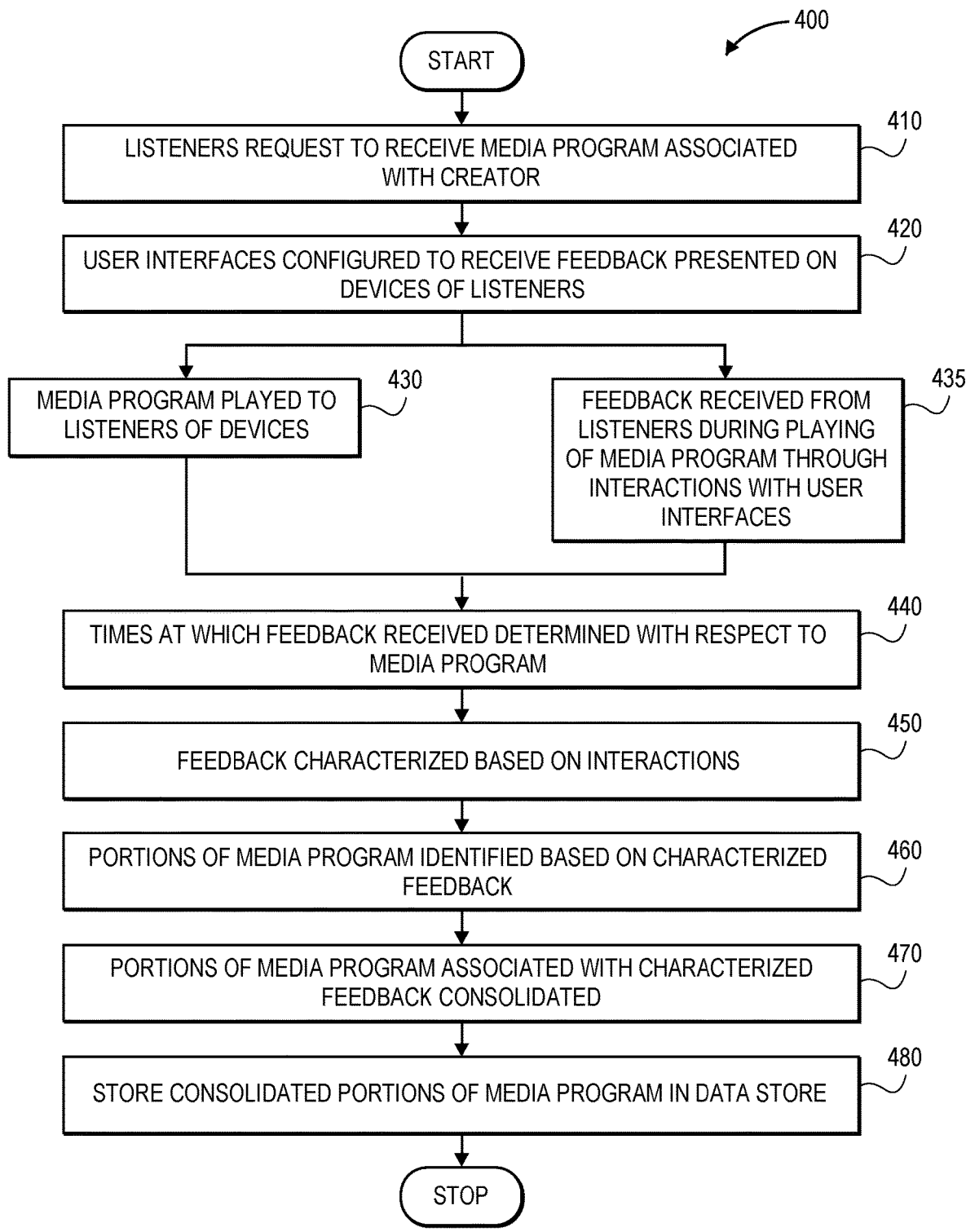
FIG. 4 is a flow chart of one process for creating media content streams in accordance with embodiments of the present disclosure.

Referring to FIG. 4, a flow chart of one process for creating media content streams in accordance with embodiments of the present disclosure is shown. At box 410, one or more listeners request to receive a media program associated with a creator. For example, each of the listeners may be associated with a computer device or system, such as a portion of an automobile, a desktop computer, a gaming console, a laptop computer, a media player, a mobile device, a smartphone, a smart speaker, a tablet computer, a television, or a wristwatch. The listeners may have subscribed to a media program, or otherwise requested to receive the media program, by executing one or more gestures or other interactions with a user interface or other input/output device, by providing one or more voice commands, or by taking any other relevant action to communicate an intent to receive the media program to a control system, a mixing system, a conference system, or a broadcast system associated with the media program. In some implementations, the media program may be associated with multiple creators.

At box 420, one or more user interfaces configured to receive feedback are presented on devices of the listeners that requested to receive the media program associated with the creator at box 410. For example, a user interface having one or more of the same features as the user interface 130-2 shown in FIG. 1C, or one or more other features, may be displayed on such devices prior to the playing of the media program, or as the media program is played by such devices.

In some implementations, the user interfaces may include one or more interactive features enabling listeners to express an opinion or other emotion regarding a media program. Such interactive features may be represented by any number of icons, characters, symbols or other visual indicator, each of which may correspond to one of a plurality of emotions, opinions or characterizations, and may be selected or otherwise interacted by listeners to indicate their emotions, opinions or characterizations at any given time. For example, in some implementations, the user interfaces may include one or more "widgets," application programming interfaces (e.g., "API"), or other features that are configured to receive interactions in the form of entries of text, characters or symbols, as well as selections or other interactions indicating an emotion or an opinion regarding the media program.

In some implementations, the user interfaces may further include one or more identifiers or information regarding the media program, e.g., a title of the media program, a name of one or more creators of the media program, a motto or description of the media program, a rating of the media program, a number of subscribers to the media program, titles or descriptions of any media content playing or to be played in accordance with the media program, or any elements or features for playing, pausing, stopping, rewinding or fast-forwarding media content. The user interfaces may also include one or more features for displaying chat messages received from creators or any listeners, as well as any number of other chat messages, as well as any number of features for receiving chat messages or other text-based feedback by one or more gestures or other interactions with the user interfaces.

At box 430, the media program is transmitted to devices of the listeners that subscribed to or otherwise requested the media program. For example, one or more communications channels may be established between one or more systems and each of the devices of such listeners. Media content associated with the media program in the form of voice samples or other speech by the creator, as well as any other type or form of media content such as advertisements, music, news, sports, weather, or other programming, may be transmitted to such devices. The media program may also be transmitted to devices associated with the creator, or to any other devices that need not be associated with one of the listeners that requested to receive the media program at box 410, in any format. In some implementations, media content of a media program transmitted to the devices of the listeners may include audio files (e.g., music, podcasts, news, or others) of any form or format, such as one or more Advanced Audio Coding ("AAC"), Audio Interchange File Format ("AIFF"), lossless audio codec, lossless encoder, Moving Picture Experts Group (or "MPEG") Audio Layer III (e.g., "MP3"), Vorbis (e.g., Ogg Vorbis), Waveform Audio File ("WAV"), Windows Media Audio ("WMA"), or other forms or formats, and at any bit rate or level of compression (e.g., 128, 192, 256 or 320 kilobits per second).

In parallel, at box 435, feedback is received from listeners during the playing of the media program through interactions with the user interfaces presented on the devices of the listeners at box 430. Selections of one or more of the icons, characters, symbols or other visual indicators provided on the user interfaces, e.g., in response to gestures or other interactions with an input/output device, or upon receiving one or more spoken commands or utterances, may be processed to confirm that a listener approves of media content then being played, disapproves of the media content, or has some emotion or opinion other than approval or disapproval of the media content. Indications of the interactions by each of the listeners and any associated emotions or opinions of media content associated with the interactions may be stored in one or more data stores. Interactions need not be received from all listeners of a media program in accordance with implementations of the present disclosure, however. Furthermore, interactions may be received from any other individuals associated with a media program, including not only creators of the media program, but also one or more hosts, guests, or contributors to the media program, in addition to listeners.

At box 440, times at which the feedback was received are determined with respect to the media program. For example, when an interaction is received from a listener five minutes after a media program began, a time (e.g., a time stamp) of five minutes is recorded with respect to the media program for that interaction. The times may be determined with respect to a beginning of a media program, with respect to an end of the media program, or with respect to any other point during the media program.

At box 450, the feedback is characterized based at least in part on the interactions. For example, where the interactions are received over a period of time, a rate or a frequency at which interactions have been or are being received at a given time, or a total number of interactions that have been received by the given time, may be calculated and compared to one or more predetermined thresholds to determine whether the feedback is particularly noteworthy at any given time. Moreover, where the feedback involves contact with or selections of icons, characters, symbols or other visual indicators associated with emotions, opinions or characterizations displayed on a user interface, the feedback may be characterized based on the respectively selected indicators. Feedback may be characterized based on numbers of interactions received from listeners or other individuals in the aggregate, or numbers of specific types of interactions received, e.g., "positive," "negative" or "neutral," or with respect to contrasting terms such as "happy" or "sad," "inspirational" or "depressing," "peaceful" or "disturbed," "angry" or "content," or by any other identifier or pair of identifiers, and to any extent or degree thereof.

At box 460, one or more portions of the media program are identified based on the characterized feedback. For example, times with respect to the media program at which rates or frequencies exceed one or more predetermined thresholds may be identified, and portions of the media program being transmitted or played at such times may be determined. In some implementations, a point in time during the media program at which a rate or a frequency, or a number of interactions, exceeds a threshold may be identified and used to select a portion of the media program being transmitted or played at or near that point in time. In some other implementations, a duration of the portion of the media program may also be identified based on the rates, the frequencies or the numbers of interactions, or in any other manner.

At box 470, the portions of the media program associated with the characterized feedback are consolidated, e.g., into a single media file, or into one or more media files of a media program. Alternatively, the portions of the media program may be identified in any other manner. At box 480, the consolidated portions of the media program are stored in one or more data stores, and the process ends. For example, the consolidated portions may be stored in a single file, or in multiple files, and in association with the media program (e.g., the full media program from which the portions associated with the characterized feedback were identified), or separately. The consolidated portions may be accessed by the creator, one or more listeners, or any other systems associated with the creator or the media program (e.g., a control system, a mixing system, a conference system, a broadcast system) on any basis.

Interactions received during a media program may be characterized in any manner and used to identify highlighted portions of the media program that are particularly relevant to listeners or others. For example, points in time at which interactions were received in large or small numbers or at high or low rates or frequencies, may be identified with respect to the media program and characterized to determine whether portions of the media program being played at such times are particularly relevant or not relevant, or are associated with one or more specific emotions or opinions.

Figure 5A:
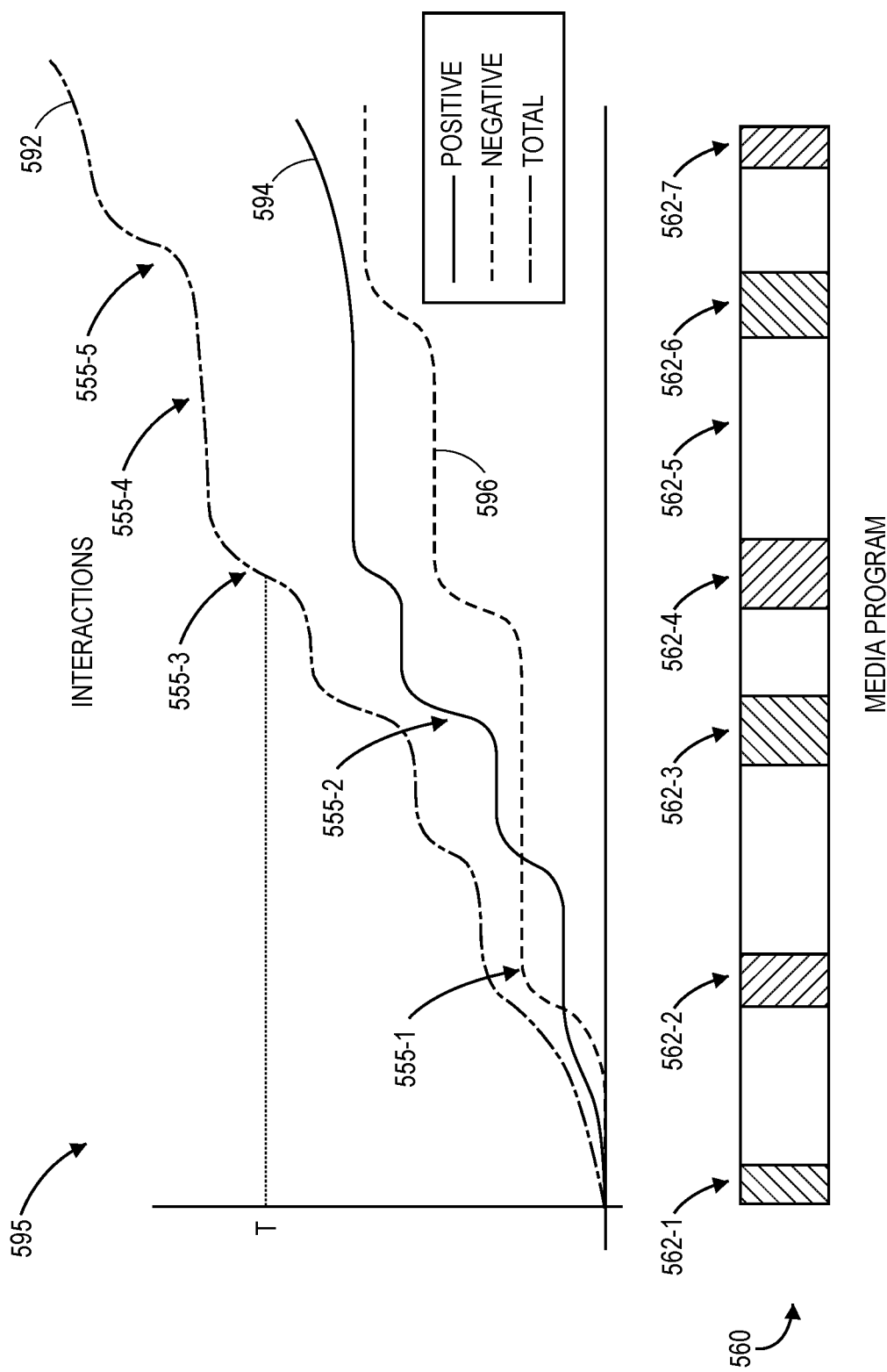
FIGS. 5A and 5B are views of aspects of one system for creating media content streams in accordance with embodiments of the present disclosure.
Figure 5B:
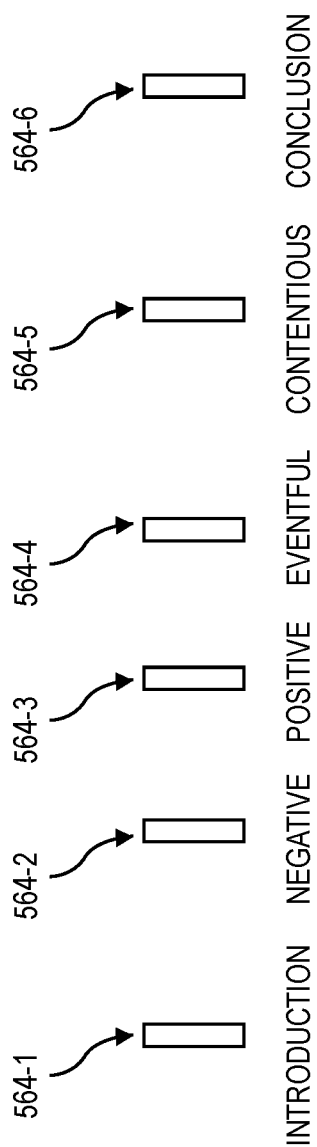
Figure 5B:
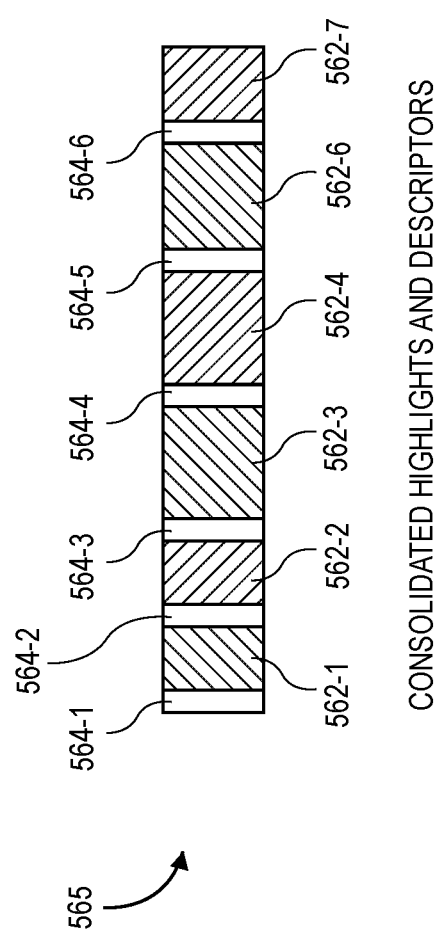

Referring to FIGS. 5A and 5B, views of aspects of one system for creating media content streams in accordance with embodiments of the present disclosure are shown. Except where otherwise noted, reference numerals preceded by the number "5" shown in FIGS. 5A and 5B indicate components or features that are similar to components or features having reference numerals preceded by the number "3" shown in FIG. 3, by the number "2" shown in FIGS. 2A and 2B or by the number "1" shown in FIGS. 1A through 1G.

As is shown in FIG. 5A, a plot 595 depicts total interactions 592, which include both positive interactions 594 and negative interactions 596, received from listeners (or any other individuals) during a playing of a media program.

The plot 595 shown in FIG. 5A indicates an extent to which any number of listeners interacted with one or more user interfaces or otherwise expressed any emotions, opinions or characterizations regarding the media program at any time. For example, as is shown in FIG. 5A, at or near a point 555-1 in time during the playing of the media program 560, negative interactions 596 exceeded positive interactions 594, while at or near a point 555-2 in time during the playing of the media program 560, positive interactions 594 were being received at an increasingly high rate. Additionally, at or near a point 555-3 in time during the playing of the media program 560, total interactions 592 (e.g., positive interactions 594 and negative interactions 596) received exceeded a threshold T, while at or near a point 555-4 during the playing of the media program 560, numbers of the positive interactions 594 and the negative interactions 596 received from listeners were substantially constant, indicating that few or no new interactions were being received at that time. Finally, at or near a point 555-5 during the playing of the media program 560, the number of positive interactions 594 received from listeners was approximately equal to the number of negative interactions 596 received from listeners.

As is also shown in FIG. 5A, portions of the media program 560 may be identified based on interactions received from listeners, e.g., based on emotions or opinions identified from such interactions, or on any other basis. For example, a portion 562-1 at a beginning of the media program 560 may be identified as a highlight, e.g., marking an introduction to the media program 560. Likewise, a portion 562-2 of the media program 560 corresponding to the point 555-1 in time during the playing of the media program 560 is identified as a highlight, e.g., where negative interactions 596 exceeded positive interactions 594, and a portion 562-3 corresponding to the point 555-2 in time during the playing of the media program 560 is identified as a highlight, e.g., when positive interactions 594 were being received at an increasingly high rate. A portion 562-4 of the media program 560 corresponding to the point 555-3 in time during the playing of the media program 560 is identified as a highlight, e.g., when total interactions 592 received exceeded a threshold T, while a portion 562-5 of the media program is not identified as a highlight due to the fact that very few interactions were received from listeners at or near this point, as the total interactions 592 were increasing at a slow rate. Finally, a portion 562-6 of the media program 560 corresponding to the point 555-5 in time during the playing of the media program 560 is identified as a highlight, e.g., when the number of positive interactions 594 received from listeners was approximately equal to the number of negative interactions 596 received from listeners, while a portion 562-7 of the media program is identified as a highlight, e.g., marking a conclusion to the media program 560.

In some implementations of the present disclosure, portions of a media program identified as highlights, e.g., the portions 562-1, 562-2, 562-3, 562-4, 562-6, 562-7 shown in FIG. 5A, may be processed to identify or determine descriptors of such portions. Subsequently, the portions may be consolidated into a media program, along with media content representing such descriptors, and the consolidated media program, e.g., a "highlight reel," may be stored in one or more data stores.

As is shown in FIG. 5B, where the portion 562-1 of the media program 560 is identified as a highlight because the portion 562-1 is played at a beginning of the media program 560, media content 564-1 in the form of spoken words or other sounds, or one or more visual effects to be shown on one or more displays, that describes or identifies the portion 562-1 as an "introduction" may be generated. Likewise, media content 564-2 that describes or identifies the portion 562-2 as "negative," and media content 564-3 that describes or identifies the portion 562-3 as "positive," may also be generated. Additionally, media content 564-4 that describes or identifies the portion 562-4 as "eventful," and media content 564-5 that describes or identifies the portion 562-6 as "contentious," may be further generated. Finally, media content 564-6 that describes or identifies the portion 562-7 as a "conclusion" may be generated.

As is further shown in FIG. 5B, a consolidated media program 565 may be formed by combining the portions 562-1, 562-2, 562-3, 562-4, 562-6, 562-7 identified as highlights of the media program 560, and the media content 564-1, 564-2, 564-3, 564-4, 564-5, 564-6 that describes or identifies such portions 562-1, 562-2, 562-3, 562-4, 562-6, 562-7. The consolidated media program 565 may then be stored in one or more data stores, separately or along with the media program 560. One or more options for viewing or listening to the consolidated media program 565, as alternative to or in lieu of the media program 560, may be presented to listeners.

Figure 6A:
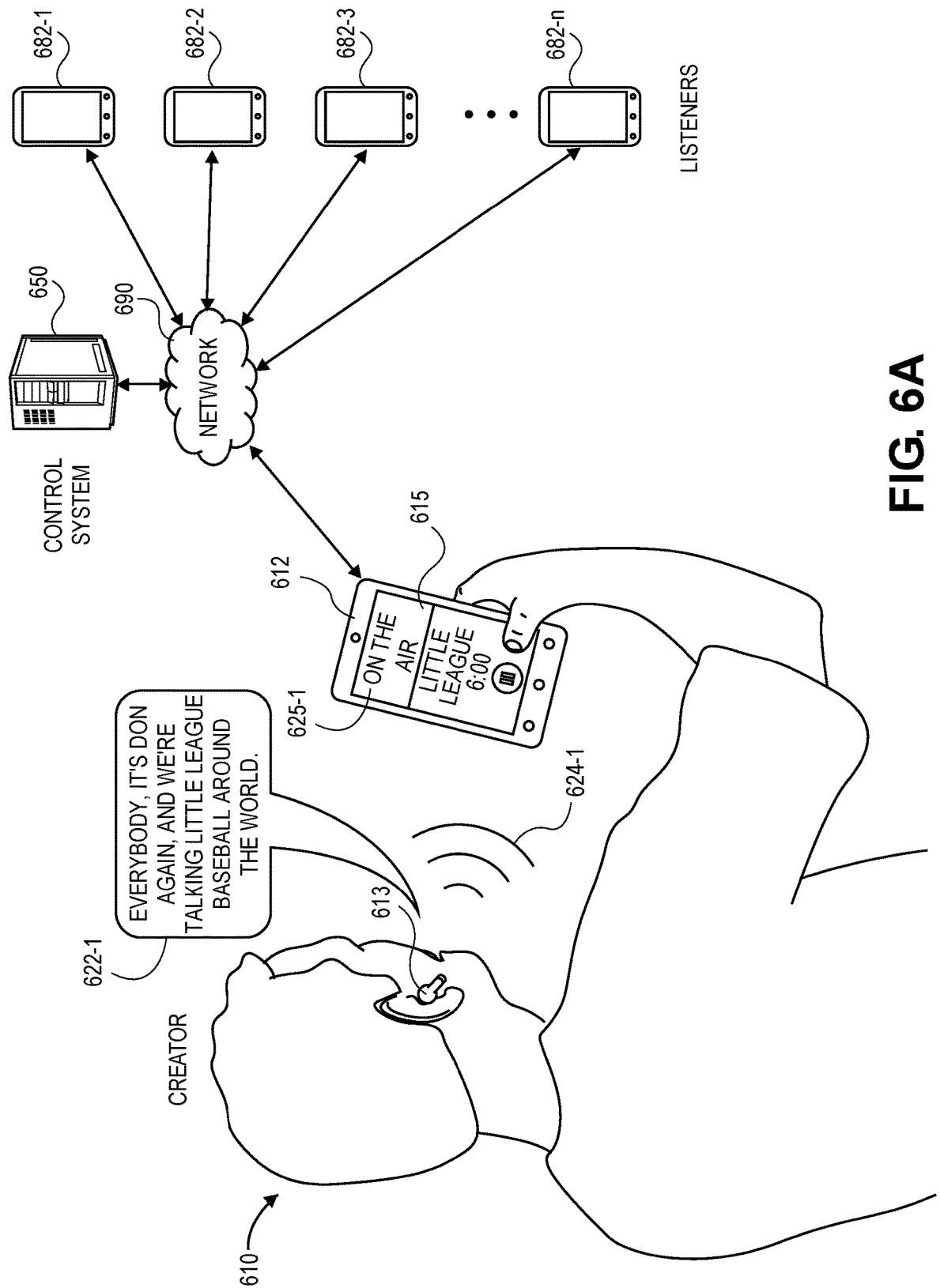
FIGS. 6A through 6C are views of aspects of one system for creating media content streams in accordance with embodiments of the present disclosure.
Figure 6B:
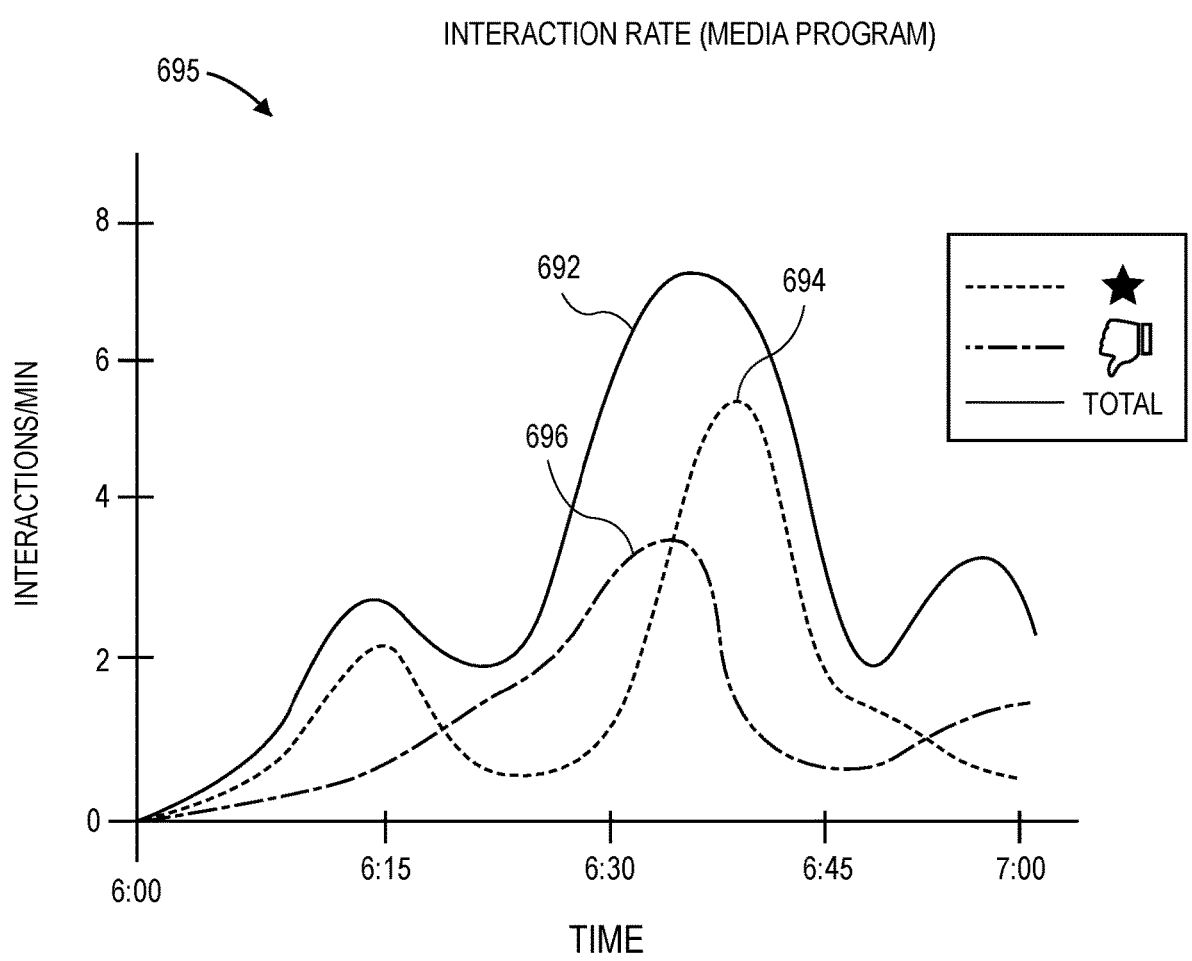
Figure 6C:
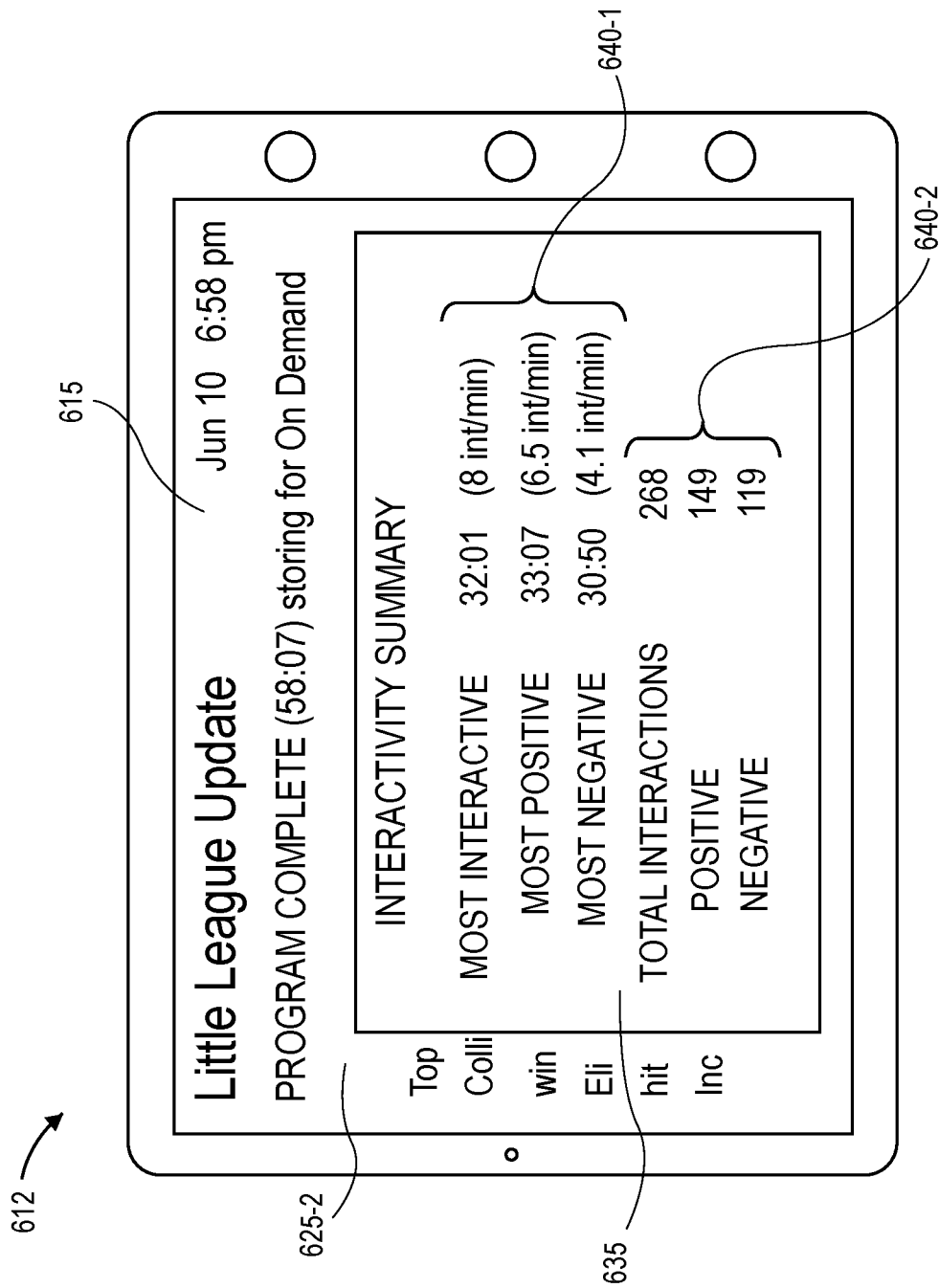

In some implementations, information regarding interactivity with a media program may be presented to a creator of the media program, or to one or more listeners of the media program, and a creator may specifically select portions of media programs to be consolidated. Referring to FIGS. 6A through 6C, views of aspects of one system for creating media content streams in accordance with embodiments of the present disclosure are shown. Except where otherwise noted, reference numerals preceded by the number "6" shown in FIGS. 6A through 6C indicate components or features that are similar to components or features having reference numerals preceded by the number "5" shown in FIGS. 5A and 5B, by the number "3" shown in FIG. 3, by the number "2" shown in FIGS. 2A and 2B or by the number "1" shown in FIGS. 1A through 1G.

As is shown in FIG. 6A, a creator 610 of a media program provides an utterance 622-1 to a mobile device 612 (e.g., a tablet computer, a smartphone, or any other computer device or system) having one or more user interfaces 625-1 rendered on a display 615. The user interfaces 625-1 may be rendered on the display 615 by a dedicated application associated with the playing of the media program, or by a general application such as a browser, e.g., by interpreting code received from a control system 650 or from any other source. Acoustic data 624-1 captured by the mobile device 612 may be transmitted to the control system 650 or to one or more devices 682-1, 682-2, 682-3 . . . 682-n of any number n of listeners over one or more networks 690. For example, the utterance 622-1 states that at least a portion of the media program will discuss Little League baseball, viz., "hey, everybody, it's Don again, and we're talking Little League baseball around the world." Upon receiving the acoustic data 624-1, the devices 682-1, 682-2, 682-3 . . . 682-n may cause one or more words of the utterance 622-1 to be played to listeners within a vicinity of the devices 682-1, 682-2, 682-3 . . . 682-n.

During the playing of the media program, any number of interactions may be received from listeners associated with one or more of the devices 682-1, 682-2, 682-3 . . . 682-n, who may execute one or more gesture or other interactions with user interfaces displayed thereon, which may include one or more features that are similar to those of the user interface 130-2 shown in FIG. 1C, e.g., the interactive features 136-1, 136-2, 136-3, or any other features.

As is shown in FIG. 6B, a plot 695 depicts rates at which interactions are received during the playing of the media program hosted by the creator 610. In particular, the plot 695 depicts a total interaction rate 692 (e.g., a number of interactions received per minute), as well as a positive interaction rate 694 and a negative interaction rate 696 (e.g., numbers of positive and negative interactions, respectively, received per minute). The plot 695 may be shown on one or more user interfaces associated with the creator 610, e.g., on the mobile device 612, or on any other user interfaces or mobile devices. Alternatively, or additionally, the plot 695 may depict total numbers of interactions, as well as numbers of positive and negative interactions, or any other information or data regarding the media program, together with the interaction rates shown in FIG. 6B or separately.

Information regarding listener interactivity during a media program may be presented to a creator, either while the media program is in progress or after the media program has concluded. As is shown in FIG. 6C, a window 635 is shown on or over a user interface 625-2 rendered on the display 615 of the mobile device 612, following the completion of the media program. The window 635 includes information 640-1 identifying a time with respect to the media program at which a greatest rate of interactivity was observed, or thirty-two minutes and one second, as well as the interactivity rate at that time, or eight interactions per minute. The information 640-1 further identifies times with respect to the media program at which greatest rates of positive and negative interactivity were observed, or thirty-three minutes and one second, and thirty minutes and fifty seconds, respectively, and the positive and negative interactivity rates at such times, or 6.5 interactions per minute and 4.1 interactions per minute, respectively. The window 635 further includes information 640-2 identifying a total number of interactions received from listeners during the media program, as well as numbers of positive and negative interactions, respectively, that were received from listeners during the media program.

Alternatively, the window 635 may include any other information regarding listener interactivity during the media program, and is not limited to interactive rates (e.g., total, positive, negative) or numbers of interactions, or the types of interactions shown in FIGS. 6A and 6B. Moreover, in some implementations, a window or other representation of information regarding listener interactivity during the media program, such as is shown in the window 635 of FIG. 6C, may also be shown on displays of one or more of the devices 682-1, 682-2, 682-3 . . . 682-n, either while the media program is in progress or after the media program has concluded.

A listener, a creator, or any other individual associated with a media program may select a portion of the media program, and execute an interaction with that portion of the media program, in any number of ways. Referring to FIGS. 7A through 7E, views of aspects of one system for creating media content streams in accordance with embodiments of the present disclosure are shown. Except where otherwise noted, reference numerals preceded by the number "7" shown in FIGS. 7A through 7E indicate components or features that are similar to components or features having reference numerals preceded by the number "6" shown in FIGS. 6A through 6C, by the number "5" shown in FIGS. 5A and 5B, by the number "3" shown in FIG. 3, by the number "2" shown in FIGS. 2A and 2B or by the number "1" shown in FIGS. 1A through 1G.

Figure 7A:
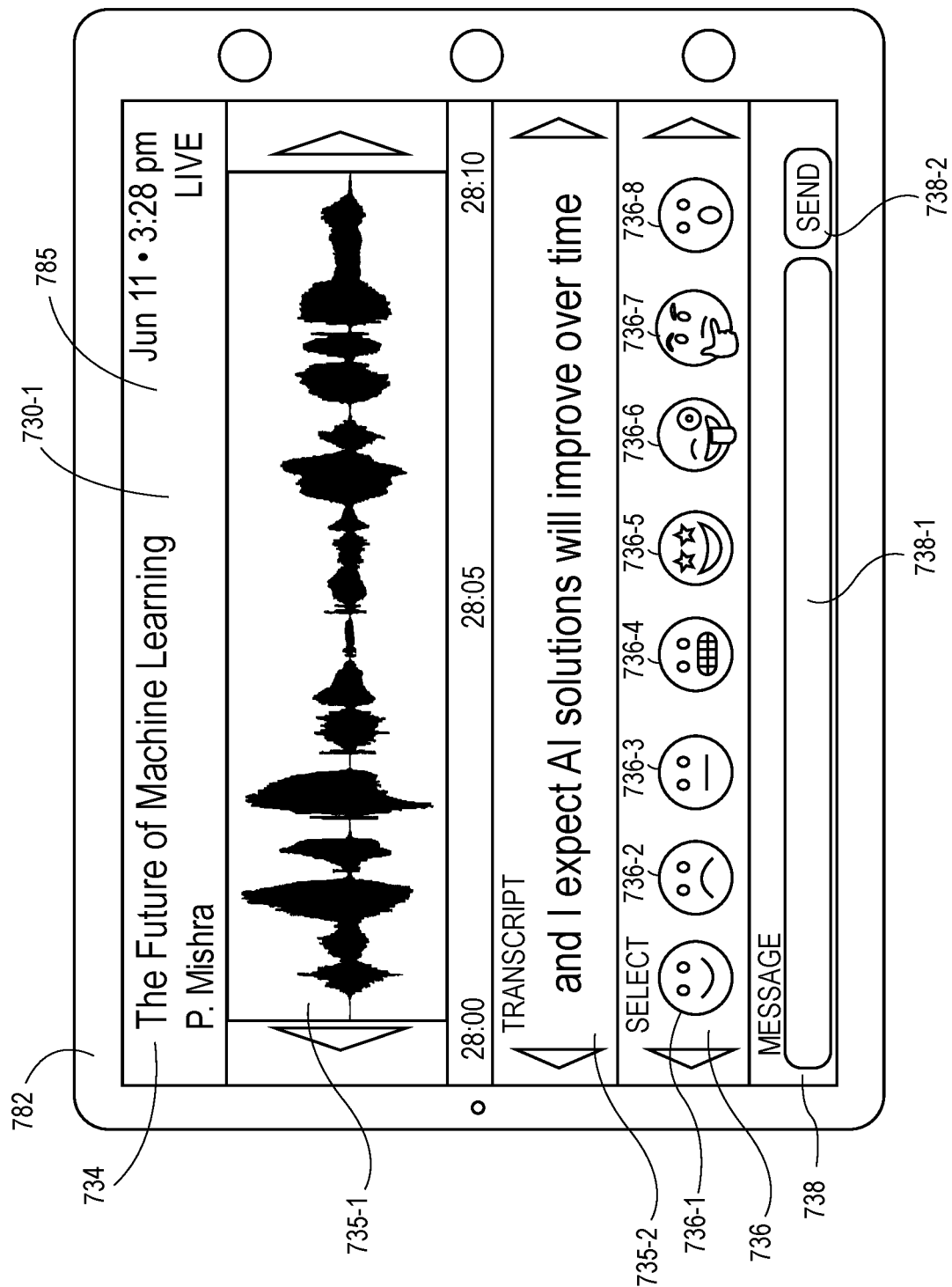
FIGS. 7A through 7E are views of aspects of one system for creating media content streams in accordance with embodiments of the present disclosure.

As is shown in FIG. 7A, a user interface 730-1 is shown on a display 785 of a device 782 associated with a listener as a media program is played by the device 782. The user interface 730-1 includes a section 734 provided at an upper edge or area of the display 785, and includes one or more identifiers or information regarding the media program, including but not limited to a title of the media program and a name of the creator of the media program, as well as a current date and a time.

The user interface 730-1 may further include a section 735-1 provided below the section 734. The section 735-1 depicts amplitudes (e.g., a waveform) of acoustic signals transmitted during a media program. The acoustic signals depicted in the section 735-1 may include or represent words that are spoken or sung by one or more participants in the media program, or any other sounds. The section 735-1 may represent the amplitudes in sound pressure levels or any other measures of intensity, and to any scale.

The section 735-1 presents a visual representation of amplitudes of the acoustic signals on a rolling basis, and synchronized to times (e.g., time stamps) at which the corresponding acoustic signals were received by the device

782, or by any other devices (not shown) and transmitted to the device 782. Additionally, the section 735-1 further includes selectable features that enable a listener to advance forward or backward with respect to the media program, and view the acoustic signals that were received at any time with respect to the media program.

The user interface 730-1 may also include a section 735-2 provided below the section 735-1. The section 735-2 depicts words that are transcribed from the acoustic signals to transcribe any words expressed therein, e.g., by one or more machine learning algorithms, systems or techniques. The section 735-2 presents the words identified within or otherwise transcribed from such acoustic signals on a rolling basis, and synchronized to times (e.g., time stamps) at which the corresponding acoustic signals were received by the device 782, or by any other devices (not shown) and transmitted to the device 782. Additionally, the section 735-2 further includes selectable features that enable a listener to advance forward or backward with respect to the media program, and view the words that were transcribed from the acoustic signals that were received at any time with respect to the media program.

The user interface 730-1 may further include a section 736 provided below the section 735-2. The section 736 may be provided beneath the section 735-2 and may include a plurality of interactive features 736-1, 736-2, 736-3, 736-4, 736-5, 736-6, 736-7, 736-8 for expressing an emotion or an opinion regarding the media program in general, or a portion of the media program in particular, by one or more interactions with the user interface 730-1. For example, as is shown in FIG. 7A, each of the interactive features 736-1, 736-2, 736-3, 736-4, 736-5, 736-6, 736-7, 736-8 is an "emoji" or a digital icon, image or symbol representative of an emotion or an opinion, and may be selected in association with the media program or any portion of the media program in order to associate the representative emotion or opinion with the media program or portion thereof. The interactive feature 736-1 is a smiling face, and may be selected to express a generally pleasant, cheery or humorous emotion or opinion with the media program or a portion thereof. The interactive feature 736-2 is a frowning face, and may be selected to express a generally concerned, disappointed or sad emotion or opinion with the media program or a portion thereof. The interactive feature 736-3 is face with a closed and substantially horizontally aligned mouth, and may be selected to express a mildly concerned, disappointed or sad emotion or opinion, or an emotion or opinion that is neutral (e.g., neither positive nor negative), regarding the media program or a portion thereof. The interactive feature 736-4 is a face having a full-toothed grin, which may be selected to express a radiant or glowing emotion or opinion, e.g., an outwardly positive emotion or opinion, with the media program or a portion thereof. The interactive feature 736-5 is a face with a broad, open smile, and with stars in lieu of eyes, which may be selected in order to express an emotion or opinion of amazement, fascination or excitement with the media program or a portion thereof. The interactive feature 736-6 is a face with raised or furrowed eyebrows and a single monocle over one of the eyes, which may be selected in order to imply that the media program or a portion thereof may be worthy of further evaluation or consideration. The interactive feature 736-7 is a face with raised or furrowed eyebrows and portions of a hand, such as a thumb and index finger, contacting the chin or a cheek of the face. The interactive feature 736-7 may be selected to express an emotion or opinion of inspection or skepticism regarding the media program or a portion thereof. The interactive feature 736-8 is a face having an open or agape mouth, which may be selected in order to express an emotion or opinion of awe, disbelief, shock or surprise with the media program or a portion thereof. The section 736 may further include a selectable feature that enables a listener to view any number of other emoji (not shown), and such emoji may be selected in order express any emotion or opinion associated therewith with the media program or a portion thereof.

The user interface 730-1 may also include a section 738 provided at a lower edge or area of the display 785, and includes a text box 738-1 or a like feature that enables a listener or any other user of the device 782 to provide text-based interactions, e.g., by executing one or more gestures or other interactions with a virtual keyboard rendered on the display 785, or making one or more audible utterances that are captured, interpreted and converted into text by the device 782. The section 738 also includes a button 738-2 or another selectable feature for transmitting text provided within the text box to a control system (or any other system), or one or more devices associated with a creator of the media program.

Figure 7B:
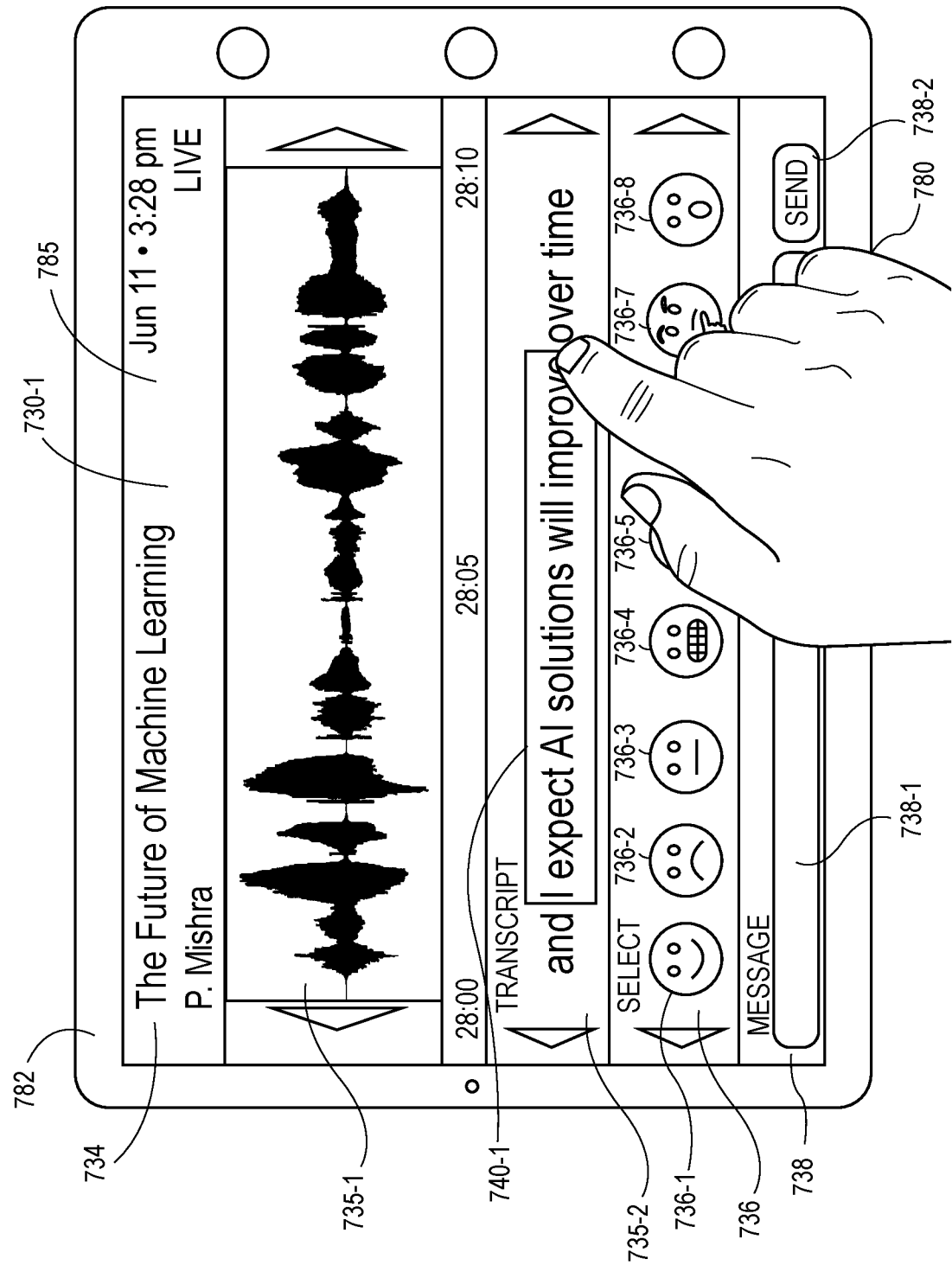

In accordance with implementations of the present disclosure, a listener, a creator or any other individual may identify or select a portion of a media program, and express one or more emotions or opinions with the selected portion of the media program, e.g., by one or more gestures or other interactions with a user interface. As is shown in FIG. 7B, a listener 780 may select a portion 740-1 of the media program by clicking and/or dragging a finger, a stylus or another object across one or more of the words shown within the section 735-2, or in any other manner. Alternatively, or additionally, the listener 780 may also select a portion of the media program by clicking and/or dragging a finger, a stylus or another object across a portion of the waveform of amplitudes shown in the section 735-1, or in any other manner.

Figure 7C:
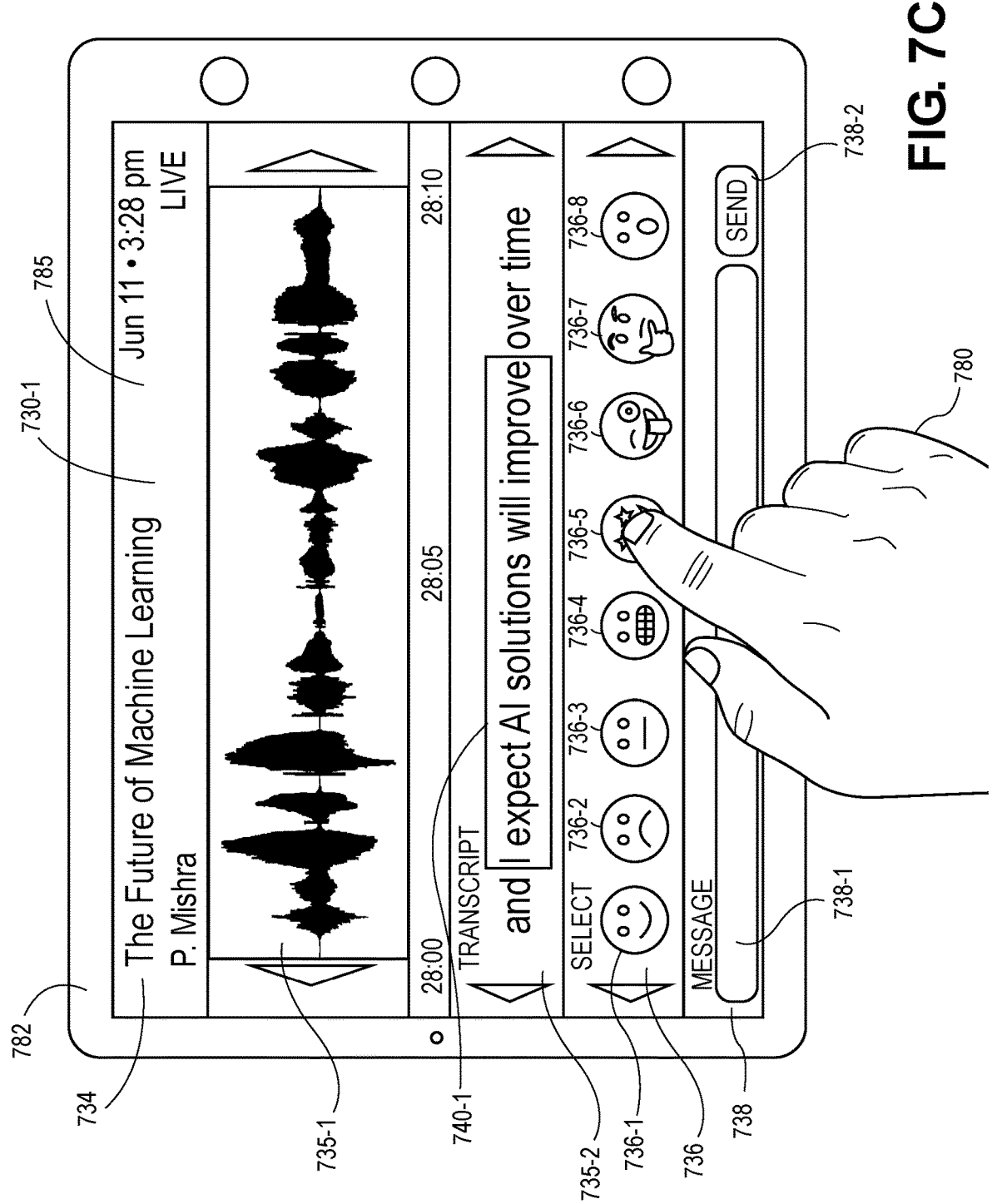

As is shown in FIG. 7C, the listener 780 may further select the interactive feature 736-5, viz., the face with the broad, open smile, and with stars in lieu of eyes. The selection of the interactive feature 736-5 thus expresses an emotion or opinion of amazement, fascination or excitement with the portion 740-1 of the media program selected by the listener 780. Alternatively, or additionally, the listener 780 may select any of the other interactive features 736-1, 736-2, 736-3, 736-4, 736-6, 736-7, 736-8 shown in the section 736, or any other interactive features not shown, in order to express emotions or opinions associated with such other interactive features 736-1, 736-2, 736-3, 736-4, 736-6, 736-7, 736-8 with the portion 740-1. An indication or a record linking the emotion or opinion associated with the interactive feature 736-5 with the listener 780 and the portion 740-1 of the media program may be stored in one or more data stores.

Figure 7D:
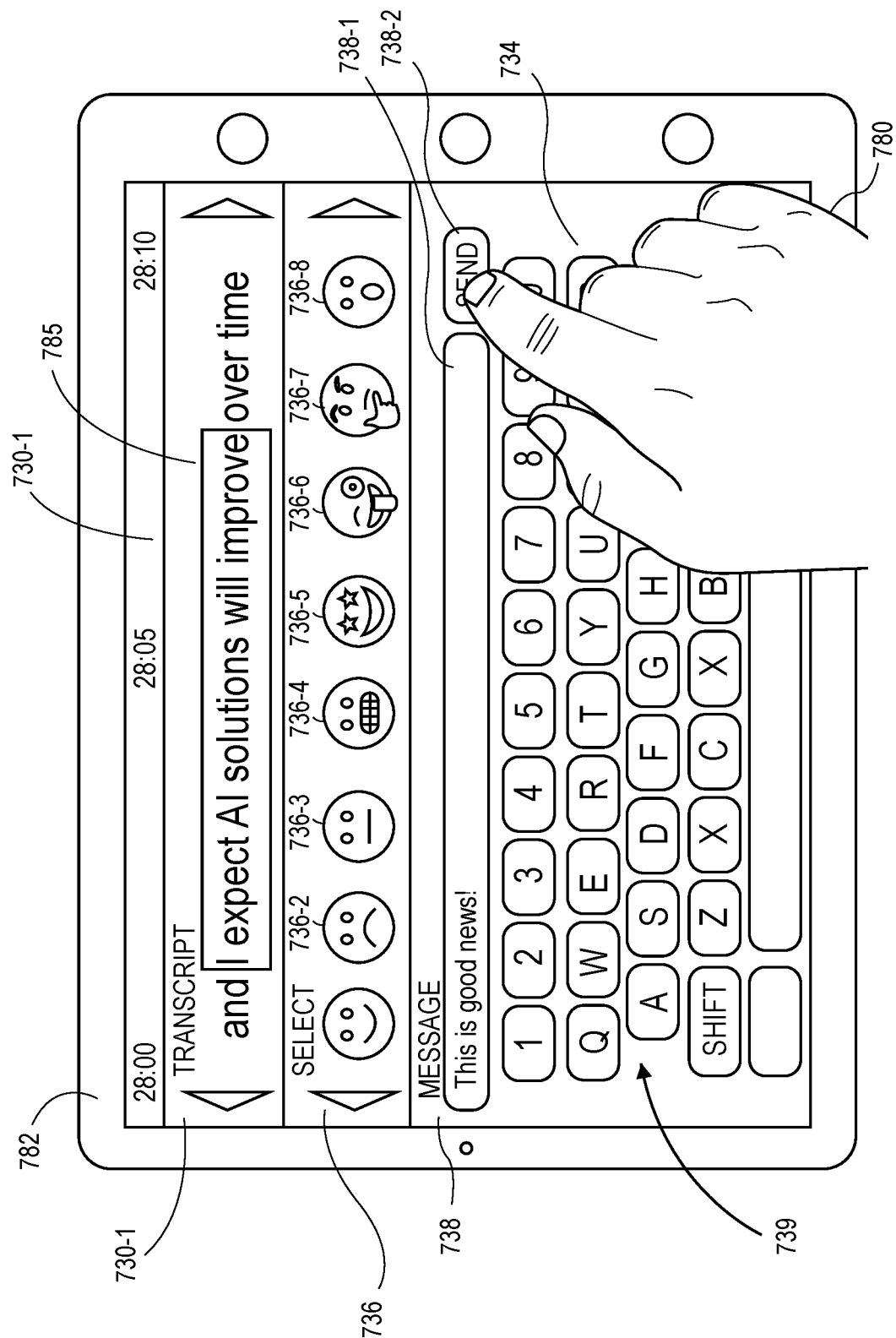

As is shown in FIG. 7D, the listener 780 may also provide an interaction with one or more portions of a media program, viz., the portion 740-1, by entering one or more sets of text or other characters or symbols into the text box 738-1. For example, as is shown in FIG. 7D, a virtual keyboard 739 may be displayed on the display 785 in response to a request or a prompt, or upon a selection of the text box 738-1, and the listener 780 may enter text, characters or symbols into the text box 738-1 by contact with portions of the virtual keyboard 739 corresponding to alphanumeric characters. The listener 780 may transmit contents of the text box 738-1 by a selection of the button 738-2, and such contents may be associated as an interaction with the portion 740-1, or any other portion of the media program selected by the listener 780.

Figure 7E:
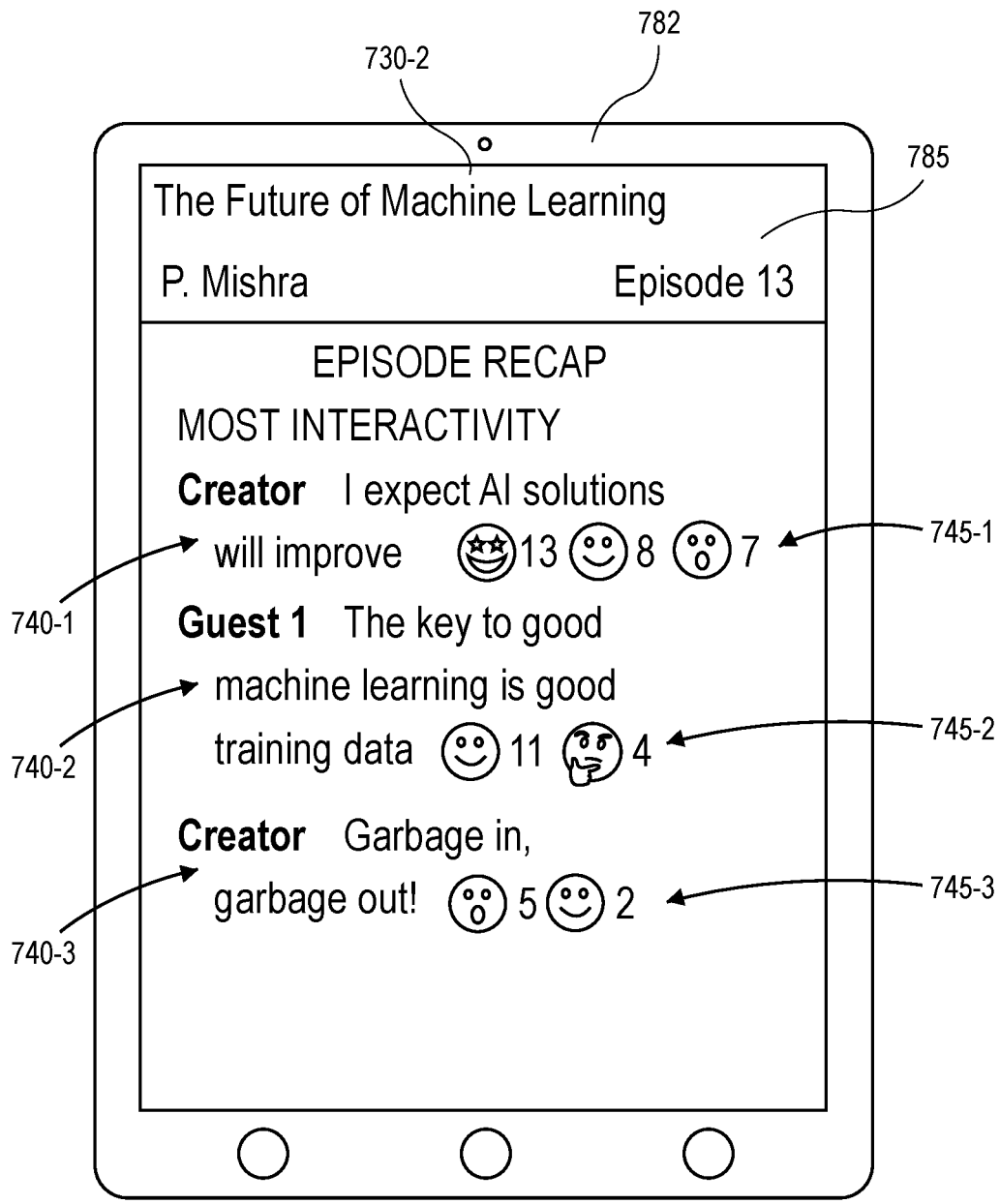

Upon a completion of a playing of the media program, or at any other time during the playing of the media program, a summary of the interactions received during the playing of the media program may be displayed to a listener, a creator, or any other individual associated with the media program. As is shown in FIG. 7E, a user interface 730-2 is shown on the display 785 of the device 782. The user interface 730-2 identifies the portion 740-1 of the media program, and other portions 740-2, 740-3 of the media program, as well as representations 745-1, 745-2, 745-3 of the interactions received during the playing of such portions 740-1, 740-2, 740-3 of the media program. The representations 745-1, 745-2, 745-3 include icons, images or symbols corresponding to one or more of the interactive features 736-1, 736-2, 736-3, 736-4, 736-5, 736-6, 736-7, 736-8 of the section 736 shown in FIGS. 7A through 7D, as well as numbers associated with each of the icons, images or symbols indicating numbers of interactions with each of such features.

For example, as is shown in FIG. 7E, the representation 745-1 indicates that the portion 740-1 was the subject of thirteen selections of the interactive feature 736-5, which represent expressions of amazement, fascination or excitement regarding the portion 740-1, as well as eight selections of the interactive feature 736-1, which represent expressions of pleasant, cheery or humorous emotion or opinions regarding the portion 740-1, and seven selections of the interactive feature 736-8, which represent expressions of awe, disbelief, shock or surprise regarding the portion 740-1. The representation 745-2 indicates that the portion 740-2 was the subject of eleven selections of the interactive feature 736-1, as well as four selections of the interactive feature 736-7, which represent expressions of inspection or skepticism regarding the portion 740-2, while the representation 745-3 indicates that the portion 740-3 was the subject of five selections of the interactive feature 736-8, and two selections of the interactive feature 736-1.

Interactions with portions of the media program may be received in any other manner, and emotions or opinions of listeners with the media program or portions thereof may be recorded in any other manner. Implementations of the present disclosure are not limited to receiving interactions by selections of words or amplitudes of a waveform, or receiving emotions or opinions by selections of icons, images or symbols representative of such emotions or opinions. Moreover, representations of interactions with portions of media programs in accordance with implementations of the present disclosure are not limited to plots or numerical depictions of icons, images or symbols.

Figure 8:
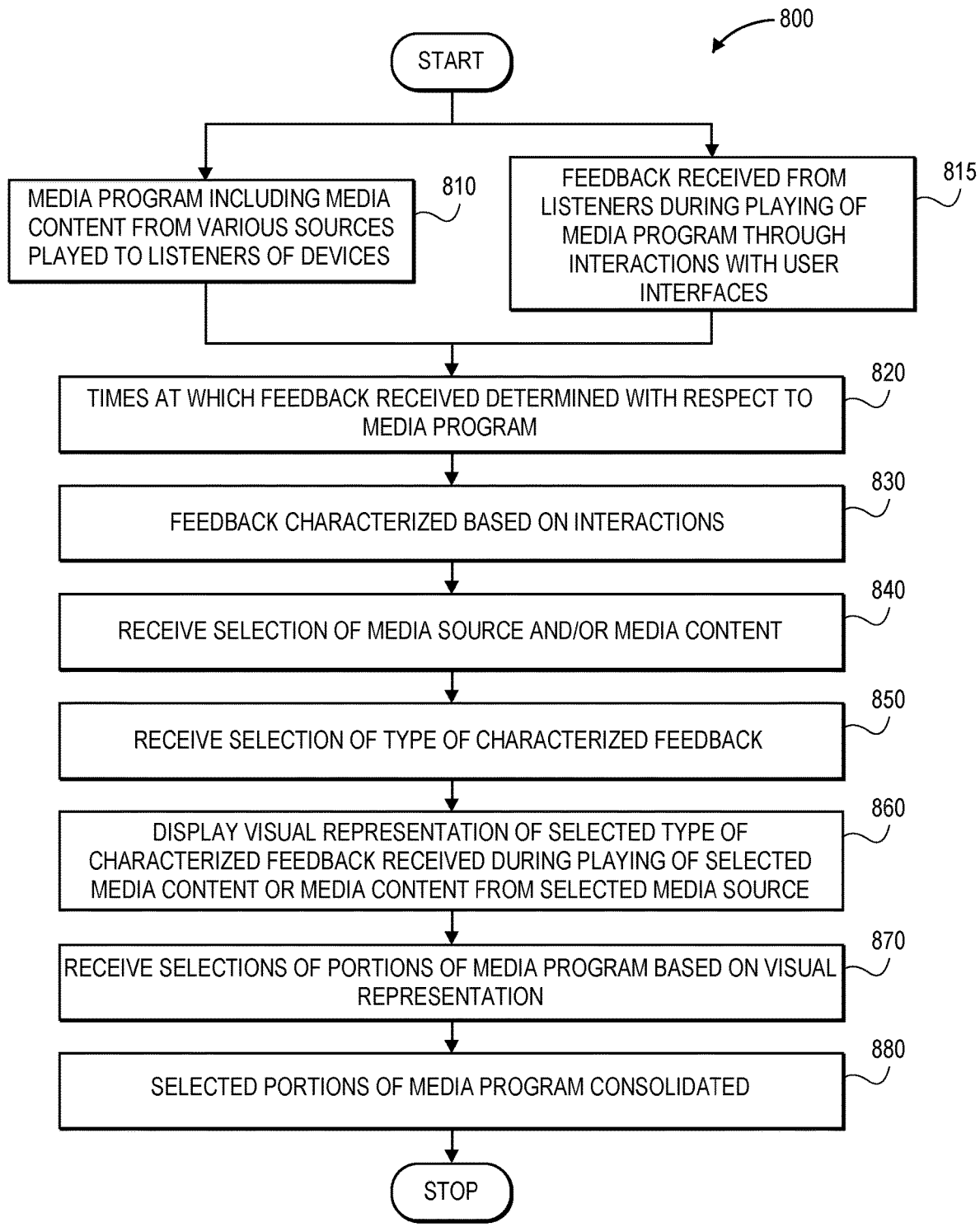
FIG. 8 is a flow chart of one process for creating media content streams in accordance with embodiments of the present disclosure.

Referring to FIG. 8, a flow chart 800 of one process for creating media content streams in accordance with embodiments of the present disclosure is shown.

At box 810, a media program including media content from various sources is played to listeners of one or more devices. For example, one or more communications channels may be established between a control system, a mixing system, a conference system or a broadcast system and each of the devices of such listeners. Media content associated with the media program may include voice samples or other speech by the creator, as well as advertisements, music, news, sports, weather, or other programming, may be transmitted to such devices, including but not limited to audio files of any form or format, and at any bit rate or level of compression.

In parallel, at box 815, feedback is received from listeners during the playing of the media program through one or more interactions with user interfaces presented on the devices of the listeners. Selections of one or more of the icons, characters, symbols or other visual indicators provided on the user interfaces, or one or more spoken commands or utterances, may be processed to confirm that a listener approves of media content then being played, disapproves of the media content, or has some emotion or opinion other than approval or disapproval of the media content. Indications of the interactions by each of the listeners and any associated emotions or opinions of media content associated with the interactions may be stored in one or more data stores, and need not be received from all listeners of a media program in accordance with implementations of the present disclosure.

At box 820, times at which the feedback is received is determined with respect to the media program, e.g., with respect to a beginning of the media program, with respect to an end of the media program, or with respect to any other point during the media program.

At box 830, the feedback is characterized based at least in part on the interactions. For example, where the interactions are received over a period of time, one or more rates, frequencies, numbers or other measures of interactions may be calculated and compared to one or more predetermined thresholds to determine whether the feedback is particularly noteworthy. Moreover, the feedback may be characterized based on any indicators that were selected in order to execute the interaction (e.g., one or more of the arrows 136-1, 136-2, 136-3 shown in FIG. 1C or the interactive features 736-1, 736-2, 736-3, 736-4, 736-5, 736-6, 736-7, 736-8 of FIG. 7A). The feedback may also be characterized based on numbers of interactions received from listeners in the aggregate, numbers of specific types of interactions received from listeners, or with respect to contrasting terms or identifiers, and to any extent or degree thereof.

At box 840, a selection of one or more of a media source or media content being played in accordance with the media program is received. For example, user interfaces rendered by devices of a creator or one or more of the listeners may further include one or more buttons, text boxes, checkboxes, drop-down menus, list boxes, toggles, pickers, search fields, tags, sliders, icons, carousels, or any other interactive or selectable elements or features by which a user may select a media source or media content. The media sources associated with a media program that may be selected may include the creator (e.g., words that are spoken or sung by the creator), any guests (e.g., musicians, celebrities, personalities, athletes, politicians, or artists, or any listeners), or any catalogs, repositories or streaming services or other sources from which media content may be received. The media content that may be selected may include one or more advertisements, songs or media files, news programs, sports programs, weather reports or any other media files, which may be live or previously recorded.

At box 850, a selection of a type of the characterized feedback is received. For example, a type of characterized feedback may be selected on a rate or frequency at which the feedback is received, or a number of interactions or other expressions of the feedback that have been received, either qualitatively (e.g., by qualitative identifiers such as high, medium or low) or quantitatively (e.g., by specific rates, frequencies or numbers). Alternatively, a type of the characterized feedback may be selected based on times at which the feedback is received with respect to the media program. As yet another alternative, type of the characterized feedback based on emotions or opinions associated with the feedback, e.g., "positive," "negative," "neutral," "happy," "sad," "inspirational," "depressing," "peaceful," "disturbed," "angry" or others, or by any other identifier or pair of identifiers, and to any extent or degree thereof.

In some implementations, selections of both a media source or media content, and a type of characterized feedback, need not be received. For example, a selection of only one of a media source or media content, or only a type of the characterized feedback, may be received.

At box 860, a visual representation of the selected type of characterized feedback received at box 850 that was received during the playing of media content from the source selected at box 840, or the media content selected at box 840, is displayed, e.g., on a device of one or more of the creator or one or more of the listeners. For example, after receiving the selections at box 840 and box 850, a plot or other representation similar to one or more of the plot 195 of FIG. 1E, the plot 595 of FIG. 5A or the plot 695 of FIG. 6B is displayed on one or more user interfaces.

At box 870, one or more selections of portions of the media program are received based on the visual representation. For example, where the visual representation depicts information or data regarding the media program, e.g., acoustic data such as amplitudes, sound pressure levels or frequencies of acoustic signals, or words spoken or sung during the media program, a creator or one or more of the listeners may select portions of the media program shown within the visual representation by one or more gestures or other interactions.

At box 880, the selected portions of the media program are consolidated, and the process ends. The selected portions may be consolidated or otherwise assembled, e.g., into a single media file, or into one or more media files, and in a serial order corresponding to an order in which such portions were presented to the listeners in the media program, or in any other order, along with one or more descriptors of such portions or any other media. The consolidated portions may be stored in one or more data stores, and presented to listeners as an option in lieu of the media program, or as an alternative to the media program, e.g., in a pre-recorded format or "on demand." The consolidated portions may then be accessed by the creator, one or more listeners, or any other systems associated with the creator or the media program (e.g., a control system, a mixing system, a conference system, a broadcast system) on any basis.

Referring to FIGS. 9A through 9D, views of aspects of one system for creating media content streams in accordance with embodiments of the present disclosure are shown. Except where otherwise noted, reference numerals preceded by the number "9" shown in FIGS. 9A through 9D indicate components or features that are similar to components or features having reference numerals preceded by the number "7" shown in FIGS. 7A through 7E, by the number "6" shown in FIGS. 6A through 6C, by the number "5" shown in FIGS. 5A and 5B, by the number "3" shown in FIG. 3, by the number "2" shown in FIGS. 2A and 2B or by the number "1" shown in FIGS. 1A through 1G.

Figure 9A:
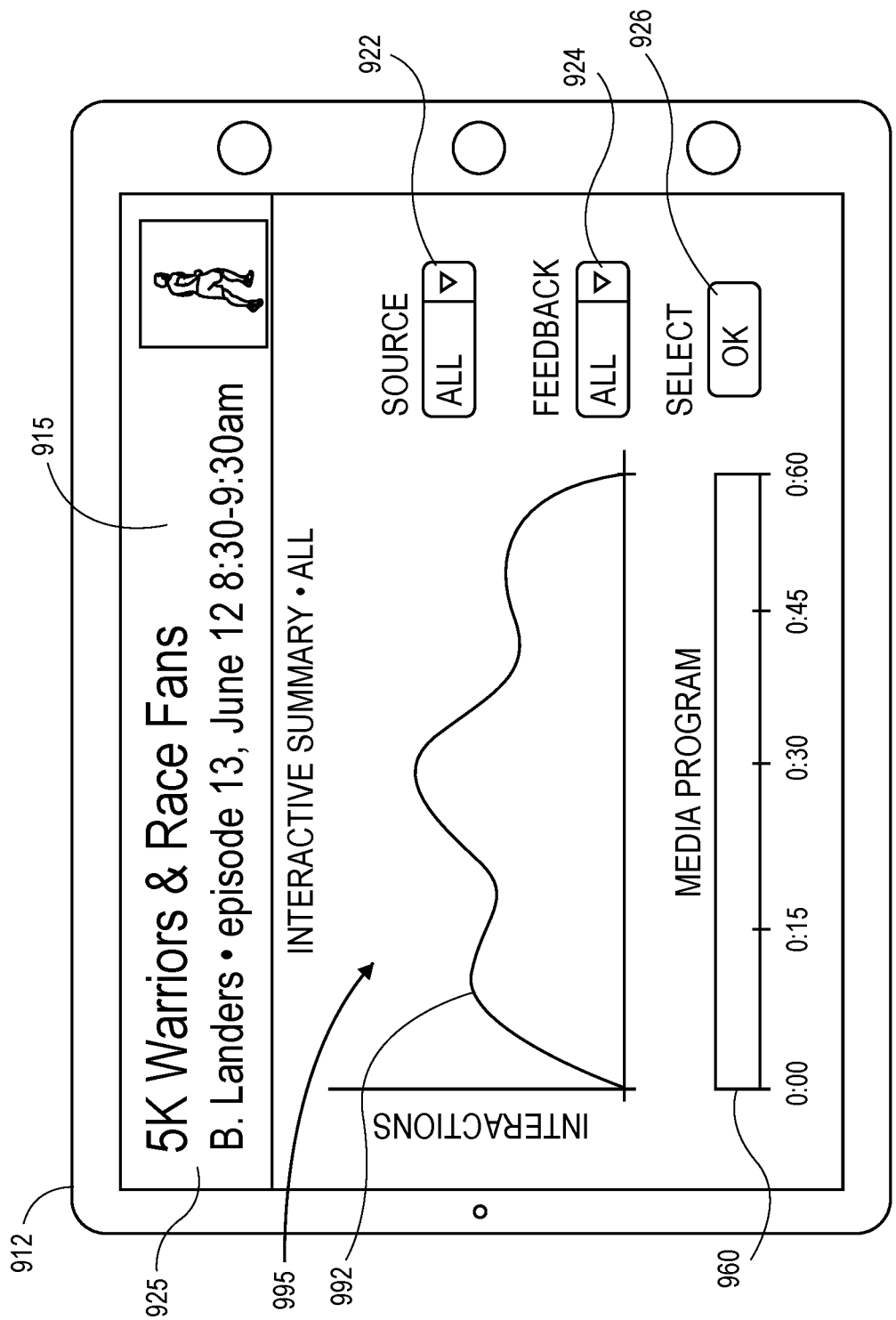
FIGS. 9A through 9D are views of aspects of one system for creating media content streams in accordance with embodiments of the present disclosure.

As is shown in FIG. 9A, a mobile device 912 of a creator of a media program includes a display 915 having a user interface 925 rendered thereon. The user interface 925 depicts a plot 995 of interactions 992 received during a playing of a media program, as well as a bar 960 or other graphical feature representing the media program. The user interface 925 may further include a plurality of interactive features 922, 924, 926, including a drop-down menu 922 for selecting a media source, a drop-down menu 924 for selecting a type of feedback, and a button 926 or other interactive feature that may be selected to update the display of information on the plot 995. Alternatively, in some implementations, the user interface 925 may further include one or more interactive features that enable the creator to select or designate media content of the media program. As is further shown in FIG. 9A, based on the selections of the drop-down menus 922, 924, the interactions 992 shown in the plot 995 represent interactions received during the playing of media from all media sources, and include feedback of all types.

Figure 9B:
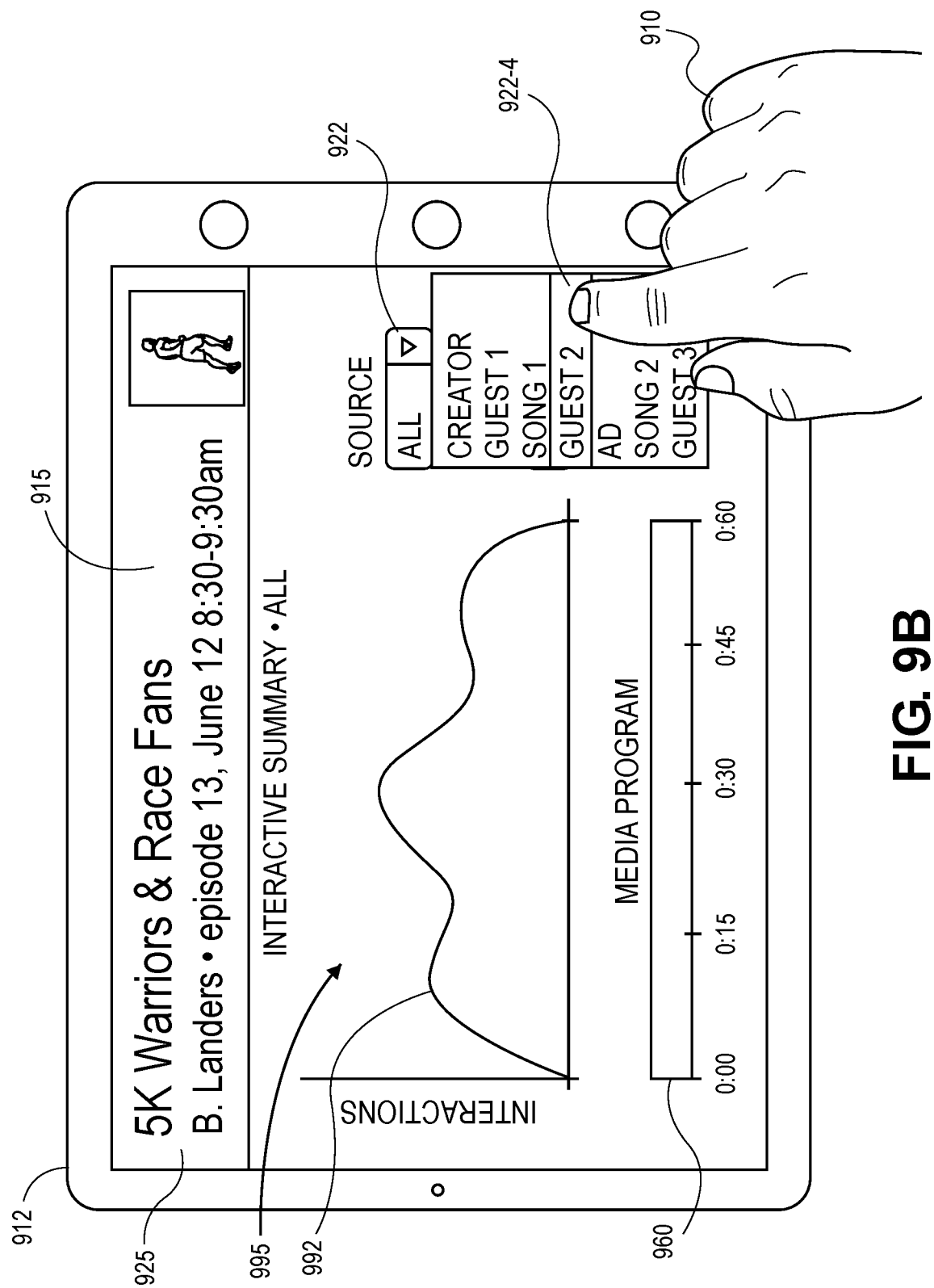

As is shown in FIG. 9B, a creator 910 selects a media source 922-4, viz., Guest 2, from a plurality of media sources represented in the drop-down menu 922. The media sources represented in the drop-down menu 922 may include any persons who produced utterances (e.g., spoke or sung words) during the media program, e.g., the creator or any guests, as well as any catalogs, repositories or streaming services or other sources from which media content may be received. Alternatively, or additionally, the creator 910 may select one or more of the media sources from the drop-down menu 922, or in any other manner.

Figure 9C:
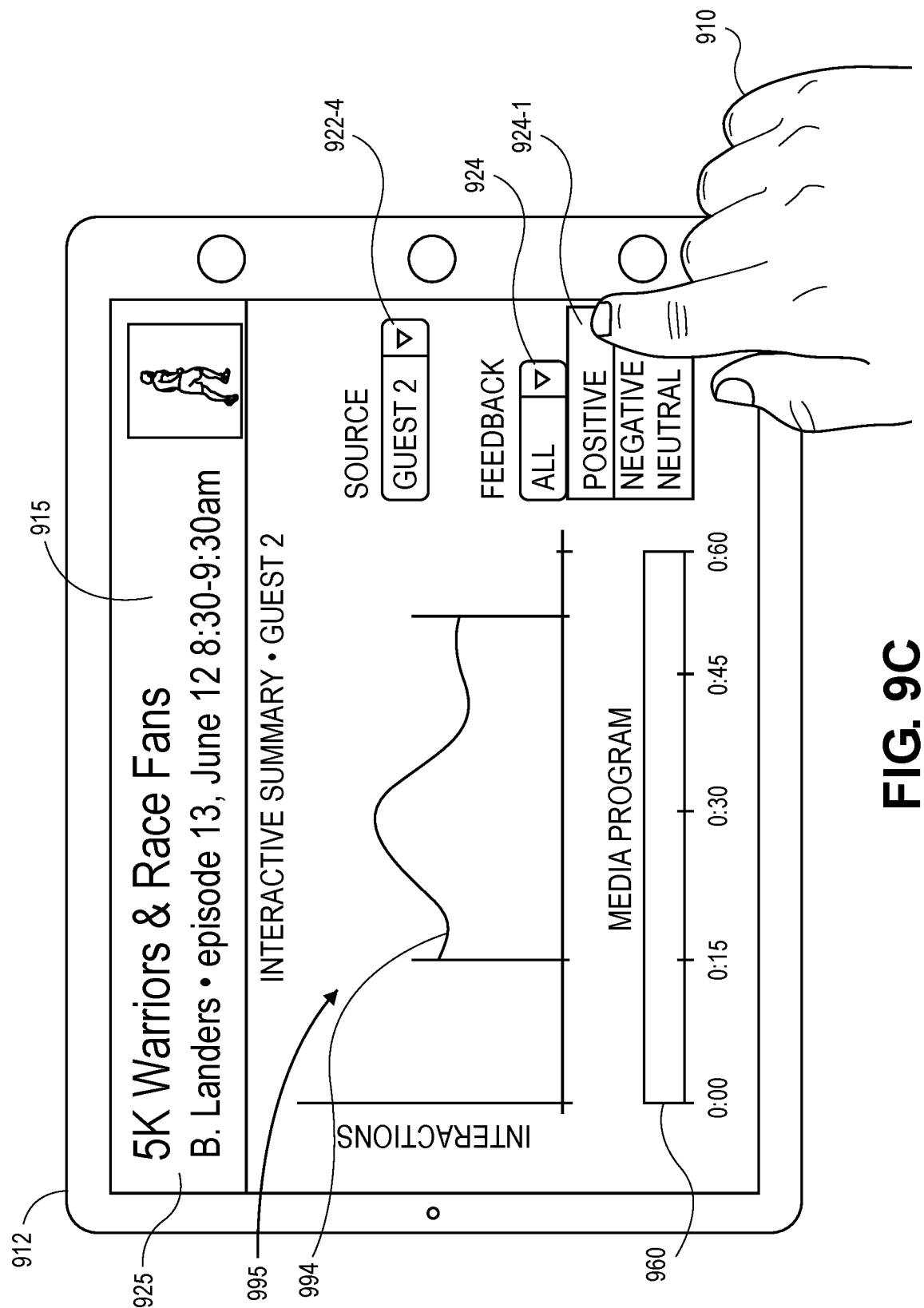

As is shown in FIG. 9C, the plot 995 is updated to depict interactions 994 received during the playing of media from the media source 922-4, e.g., from Guest 2. The plot 995 is updated to include only interactions 994 received from the creator or listeners during the portion of the media program when Guest 2 participated, and include feedback of all types. Additionally, as is also shown in FIG. 9C, the creator 910 may select a type 924-1 of feedback, viz., positive feedback, from a plurality of types of feedback represented in the drop-down menu 924.

Figure 9D:
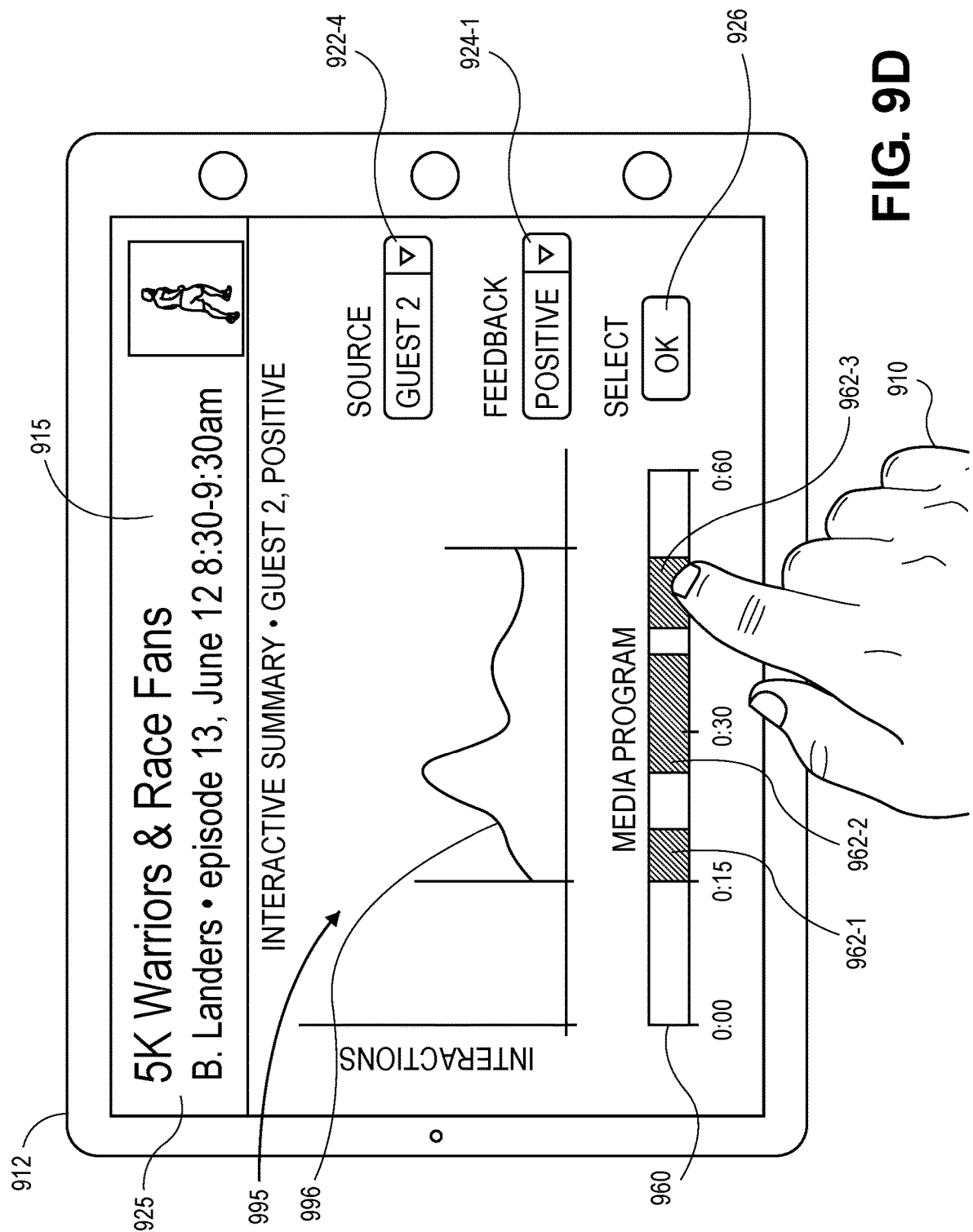

As is shown in FIG. 9D, the plot 995 is updated to depict interactions 996 received during the playing of media from the media source 922-4, and only interactions that are consistent with the type 924-1, e.g., positive interactions or other feedback. The creator 910 may rely on the plot 995 and the interactions 996 represented therein to select one or more portions 962-1, 962-2, 962-3 of the media program, e.g., by contact with one or more portions of the bar 960, or with any other information or data rendered on the user interface 925, such as is described above with respect to FIGS. 7A through 7E. After the creator 910 has selected the one or more portions 962-1, 962-2, 962-3, the creator 910 may select the button 926 to cause the portions to be automatically consolidated. The portions 962-1, 962-2, 962-3 may be consolidated into any number of media files, and in any order, along with any descriptors of such portions or other media, and made available to the creator or any listeners in a pre-recorded format (e.g., "on demand").

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

Likewise, although some of the embodiments described herein or shown in the accompanying figures refer to media programs including audio files, the systems and methods disclosed herein are not so limited, and the media programs described herein may include any type or form of media content, including not only audio but also video, which may be transmitted to and played on any number of devices of any type or form.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 4 or 8, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, one or more left-most digit(s) of a reference number identify a figure or figures in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A system comprising:
    a first computer system having at least a first data store and at least a first computer processor, wherein the first computer system is connected to one or more networks, and
    wherein the first data store has one or more sets of instructions stored thereon that, when executed by at least the first computer processor, cause the first computer system to perform a method comprising:
        transmitting media content of a first media program to each of a plurality of computer systems over the one or more networks, wherein each of the plurality of computer systems is associated with one of a plurality of listeners to the first media program;
        receiving a plurality of interactions over the one or more networks, wherein each of the plurality of interactions is entered via a user interface presented on a display of one of the plurality of computer systems during a playing of the first media program, and wherein at least one of the plurality of interactions comprises a selection of a portion of a visual representation of the first media program rendered in the user interface presented on the display of the one of the plurality of the computer systems during the playing of the first media program, wherein the visual representation is rendered in the user interface independent of the playing of the first media program;
        determining that a first interaction of the plurality of interactions was received at a first time during the playing of the first media program;
        determining that a second interaction was received at a second time during the playing of the first media program;

identifying a first portion of the first media program based at least in part on a portion of the visual representation selected in the first interaction;

identifying a second portion of the first media program based at least in part on a portion of the visual representation selected in the second interaction;

generating media content of a second media program, wherein the media content of the second media program comprises the first portion of the first media program and the second portion of the first media program;

receiving a request for the second media program from a second computer system over the one or more networks; and transmitting the media content of the second media program to the second computer system over the one or more networks in response to the request.

2. The system of claim 1, wherein the method further comprises:

determining times at which each of the plurality of interactions was received during the playing of the first media program, wherein the times include the first time and the second time; and determining that at least one of a rate of interactions received at approximately the first time or a number of the plurality of interactions received prior to the first time exceeds a predetermined threshold, wherein the first portion of the first media program is identified in response to determining that the at least one of the rate of interactions received at approximately the first time or the number of the interactions received prior to the first time exceeds the predetermined threshold.

3. The system of claim 1, wherein identifying the first portion of the first media program comprises characterizing the first interaction as one of:

positive;

negative; or neutral, wherein the first portion of the first media program is identified in response to characterizing the first interaction as the one of positive, negative or neutral, wherein identifying the second portion of the first media program comprises characterizing the second interaction as one of:

positive;

negative; or neutral, and wherein the second portion of the first media program is identified in response to characterizing the second interaction as the one of positive, negative or neutral.

4. The system of claim 1, wherein each of the first interaction and the second interaction is a selection of at least one of an icon, a character or a symbol on the user interface rendered by one of the plurality of computer systems, and wherein each of the first interaction and the second interaction is characterized based at least in part on the at least one of the icon, the character or the symbol.

5. A computer-implemented method comprising:

transmitting, by a first computer system, media content of a first media program to a plurality of computer systems over at least one network;

causing a playing of at least some of the media content of the first media program by at least a second computer system, wherein the second computer system is one of the plurality of computer systems, wherein causing the playing of the at least some of the media content of the first media program by the second computer system comprises:

causing audio data representing at least a first portion of the media content of the first media program to be played by at least one speaker associated with the second computer system; and causing a first visual representation of the audio data representing at least the first portion of the media content of the first media program to be displayed in a first user interface rendered by the second computer system;

receiving, by the first computer system, information regarding at least a first interaction with the first user interface over the at least one network, wherein the first interaction comprises a selection of at least a portion of the first visual representation corresponding to the first portion of the media content;

causing a playing of at least some of the media content of the first media program by at least a third computer system, wherein the third computer system is one of the plurality of computer systems, and wherein causing the playing of the at least some of the media content of the first media program by the third computer system comprises:

causing audio data representing at least a second portion of the media content of the first media program to be played by at least one speaker associated with the third computer system; and causing a second visual representation of the audio data representing at least the second portion of the media content of the first media program to be displayed in a second user interface rendered by the third computer system;

receiving, by the first computer system, information regarding at least a second interaction with the second user interface rendered by the third computer system over the at least one network, wherein the second interaction comprises a selection of at least a portion of the second visual representation corresponding to the second portion of the media content;

identifying, by the first computer system, the first portion of the first media program based at least in part on the information regarding at least the first interaction;

identifying, by the first computer system, the second portion of the first media program based at least in part on the information regarding at least the second interaction;

generating, by the first computer system, media content of a second media program, wherein the media content of the second media program comprises the first portion of the first media program and the second portion of the first media program; and storing, by the first computer system, the media content of the second media program in at least one data store.

6. The computer-implemented method of claim 5, further comprising:

receiving, by the first computer system, information regarding a plurality of interactions with user interfaces rendered by the plurality of computer systems over the at least one network, wherein each of the plurality of interactions comprises a selection of at least a portion of a visual representation corresponding to a portion of the media content, and wherein the plurality of interactions includes the first interaction and the second interaction;

identifying, by the first computer system, portions of the first media program based at least in part on the plurality of interactions, wherein the portions of the first media program comprise the first portion of the first media program and the second portion of the first media program; and determining, by the first computer system, that a first number of interactions corresponding to the first portion of the first media program exceeds a predetermined threshold, wherein the first portion of the first media program is identified in response to determining that the first number of the interactions exceeds the predetermined threshold.

7. The computer-implemented method of claim 6, further comprising:

determining, by the first computer system, a first duration associated with at least one of the first rate, the first number or the predetermined threshold, based at least in part on the first interaction, wherein the first portion of the first media program has at least the first duration.

8. The computer-implemented method of claim 6, further comprising:

providing at least some of the plurality of interactions and times at which each of the at least some of the plurality of interactions was received during the playing of the first media program to a machine learning system as inputs; and receiving at least one output from the machine learning system in response to the inputs, wherein the first portion of the first media program is identified based at least in part on the at least one output.

9. The computer-implemented method of claim 6, wherein receiving the information regarding at least the first interaction with the first user interface comprises:

receiving, by the first computer system, information regarding at least a third interaction with the first user interface over the at least one network, wherein the third interaction comprises a selection of at least one feature corresponding to one of a plurality of emotions, opinions or characterizations, and wherein the computer-implemented method further comprises:

associating, by the first computer system, the first portion of the first media program with the one of the plurality of emotions, opinions or characterizations, wherein the first portion of the first media program is identified based at least in part on the one of the plurality of emotions, opinions or characterizations.

10. The computer-implemented method of claim 5, wherein identifying the first portion of the first media program comprises characterizing the first interaction as one of:

positive;
negative; or
neutral, wherein the first portion of the first media program is identified in response to characterizing the first interaction as the one of positive, negative or neutral.

11. The computer-implemented method of claim 5, further comprising:

determining, by the first computer system, at least one of an emotion, an opinion or a characterization of the first interaction based at least in part on the information received regarding at least the first interaction;

selecting, by the first computer system, a description of at least the first media content based at least in part on the emotion, the opinion or the characterization; and generating, by the first computer system, third media content associated with the first media content based at least in part on the description, wherein the media content of the second media program comprises the first portion of the first media program, the second portion of the first media program, and the third media content.

12. The computer-implemented method of claim 11, wherein the first interaction further comprises a selection of at least one of an icon, a character or a symbol on the first user interface rendered by the second computer system, and wherein the emotion, the opinion or the characterization is determined based at least in part on the icon, the character or the symbol.

13. The computer-implemented method of claim 5, wherein the first user interface further comprises a first section including:

a title of the media program; and
at least one selectable feature for playing, pausing, or stopping the media program, wherein the first user interface further comprises a second section including one or more selectable features, wherein each of the one or more selectable features is configured to receive an interaction associated with one of an emotion, an opinion or a characterization, and wherein the first user interface further comprises a third section configured to receive a text-based message.

14. The computer-implemented method of claim 5, further comprising:

causing a display of a third user interface by a fourth computer system, wherein the third user interface comprises a first section including:

a title of the first media program;
a first selectable feature for requesting the first media program; and
a second selectable feature for requesting the second media program;

receiving, by the first computer system, information regarding at least a third interaction with the third user interface over the at least one network, wherein the third interaction comprises a selection of the second selectable feature; and in response to receiving the information regarding the third interaction, transmitting, by the first computer system, media content of the second media program to the fourth computer system over the at least one network.

15. The computer-implemented method of claim 5, wherein the media content of the first media program comprises at least a portion of one of:

a movie;
a song;
a podcast;
a television show;
at least one utterance of a creator of the first media program; or
at least one utterance of one of the plurality of listeners to the first media program.

16. The computer-implemented method of claim 5, wherein the second computer system is at least a portion of one of:

an automobile;
a desktop computer;
a gaming console;
a laptop computer;
a media player;
a mobile device;
a smartphone;
a smart speaker;
a tablet computer;
a television; or
a wristwatch.

17. The computer-implemented method of claim 5, further comprising:
receiving, by the first computer system, information regarding a plurality of interactions with user interfaces rendered by the plurality of computer systems over the at least one network, wherein each of the plurality of interactions comprises a selection of at least a portion of a visual representation corresponding to a portion of the media content, and wherein the plurality of interactions comprises the first interaction and the second interaction;
identifying, by the first computer system, portions of the first media program based at least in part on the plurality of interactions, wherein the portions of the first media program comprise the first portion of the first media program and the second portion of the first media program;
causing a display of information regarding the portions of the first media program on a third user interface rendered by a fourth computer system associated with a creator of the first media program;
receiving, by the first computer system, information regarding at least a third interaction with the third computer, wherein the third interaction comprises a selection of a first portion of the third user interface corresponding to the first portion of the first media program; and
receiving, by the first computer system, information regarding at least a fourth interaction with the third user interface, wherein the fourth interaction comprises a selection of a second portion of the third user interface corresponding to the second portion of the first media program,
wherein the media content of the second media program is generated after receiving the information regarding the third interaction and the information regarding the fourth interaction.

18. A first computer system having at least a first data store and at least a first computer processor, wherein the first computer system is connected to one or more networks, and
wherein the first data store has one or more sets of instructions stored thereon that, when executed by at least the first computer processor, cause the first computer system to perform a method comprising:
transmitting a first set of data to each of a plurality of computer systems over the one or more networks, wherein the first set of data represents media content of a first media program, and wherein each of the plurality of computer systems is associated with one of a plurality of listeners to the first media program;
receiving information regarding a plurality of interactions with user interfaces rendered by the plurality of computer systems over the at least one or more networks, wherein each of the plurality of interactions comprises a selection of a portion of a visual representation of at least a portion of the first media program received during a playing of at least the portion of the first media program, wherein the visual representation is rendered in the user interfaces independent of the playing of at least the portion of the first media program;
determining times at which each of the plurality of interactions was received during the playing of the first media program;
determining that at least one of a first rate of interactions received at approximately a first time during the playing of the first media program or a first number of the interactions received prior to the first time exceeds a predetermined threshold;
determining that at least one of a second rate of interactions received at approximately a second time during the playing of the first media program or a second number of the interactions received prior to the second time exceeds the predetermined threshold;
identifying a first portion of the first media program based at least in part on the first rate, the first number or the first time during the first media program;
identifying a second portion of the first media program based at least in part on the second rate, the second number or the second time during the first media program;
generating media content of a second media program, wherein the media content of the second media program comprises the first portion of the first media program and the second portion of the first media program; and
storing the media content of the second media program in at least one data store.

19. The first computer system of claim 18, wherein each of the plurality of interactions comprises the selection of a portion of a visual representation of at least a portion of the first media program and one or more of:
a selection of a first interactive element of a plurality of interactive elements provided on a user interface rendered by one of the plurality of computer systems, wherein the selection of the first interactive element causes one of a playing, a pausing, a fast-forwarding or a rewinding of the media program;
a selection of a second interactive element of the plurality of interactive elements, wherein the second interactive element is associated with one of an emotion, an opinion or a characterization;
an entry of text into at least a portion of the user interface rendered by the one of the plurality of computer systems; or
an utterance of at least one word, wherein the utterance is captured by at least one acoustic sensor associated with the one of the plurality of computer systems.

20. The first computer system of claim 18, wherein the method further comprises:
causing a display of information regarding the plurality of interactions on a display of a second computer system, wherein the information regarding the plurality of interactions comprises a visual representation of the plurality of interactions and times at which the plurality of interactions were received, and wherein the second computer system is associated with a creator of the first media program;
receiving a first interaction by the creator with a first portion of the visual representation of the plurality of interactions and times, wherein the first portion corresponds to at least one of the first rate, the first number or the first time, and wherein the first portion of the first media program is identified in response to the first interaction by the creator; and receiving a second interaction by the creator with a second portion of the visual representation of the plurality of interactions and times, wherein the second portion of the visual representation corresponds to at least one of the second rate, the second number or the second time, and wherein the second portion of the second media program is identified in response to the second interaction by the creator.

* * * * *